US012584494B2

(12) United States Patent
Kray et al.

(10) Patent No.: US 12,584,494 B2
(45) Date of Patent: *Mar. 24, 2026

(54) TURBINE ENGINE WITH COMPOSITE AIRFOILS

(71) Applicant: GENERAL ELECTRIC COMPANY, Evendale, OH (US)

(72) Inventors: Nicholas Joseph Kray, Mason, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/214,414

(22) Filed: May 21, 2025

(65) Prior Publication Data

US 2025/0283482 A1     Sep. 11, 2025

Related U.S. Application Data

(63) Continuation of application No. 18/777,725, filed on Jul. 19, 2024, now Pat. No. 12,326,155, which is a continuation-in-part of application No. 18/741,419, filed on Jun. 12, 2024, now Pat. No. 12,326,154, which is a continuation-in-part of application No. 18/171,533, filed on Feb. 20, 2023, now Pat. No. 12,158,082.

(51) Int. Cl.
| | |
|---|---|
| *F04D 29/38* | (2006.01) |
| *F04D 29/02* | (2006.01) |
| *F02K 3/06* | (2006.01) |

(52) U.S. Cl.
CPC ......... *F04D 29/388* (2013.01); *F04D 29/023* (2013.01); *F02K 3/06* (2013.01)

(58) Field of Classification Search
CPC ....................................................... F01D 5/282
See application file for complete search history.

(56) References Cited

U.S. PATENT DOCUMENTS

| | | | |
|---|---|---|---|
| 3,861,139 | A | 1/1975 | Jones |
| 4,815,940 | A | 3/1989 | Leshane |
| 5,123,813 | A | 6/1992 | Przytulski |
| 5,375,978 | A | 12/1994 | Evans |
| 5,725,355 | A | 3/1998 | Crall |
| 6,139,259 | A | 10/2000 | Ho |
| 6,217,283 | B1 | 4/2001 | Ravenhall |

(Continued)

FOREIGN PATENT DOCUMENTS

| | | |
|---|---|---|
| CN | 113123834 B | 7/2021 |
| CN | 216009013 U | 3/2022 |

(Continued)

*Primary Examiner* — Michael L Sehn
(74) *Attorney, Agent, or Firm* — McGarry Bair PC

(57) ABSTRACT

A turbine engine includes a fan and a turbomachine defining an engine centerline. The turbomachine includes a compressor section, a combustion section, and a turbine section in serial flow order. The turbine engine also includes a set of composite airfoils circumferentially arranged about the engine centerline. An airfoil in the set of composite airfoils including a composite portion extending chordwise between a composite leading edge and a trailing edge and a leading edge protector coupled to the composite portion.

16 Claims, 9 Drawing Sheets

(56) References Cited

U.S. PATENT DOCUMENTS

| | | | |
|---|---|---|---|
| 7,090,463 | B2 | 8/2006 | Milburn |
| 7,594,325 | B2 | 9/2009 | Read |
| 8,105,042 | B2 | 1/2012 | Parkin |
| 8,419,374 | B2 | 4/2013 | Huth |
| 8,573,947 | B2 | 11/2013 | Klinetob |
| 8,696,319 | B2 | 4/2014 | Naik |
| 8,814,527 | B2 | 8/2014 | Huth |
| 9,045,991 | B2 | 6/2015 | Read |
| 9,617,860 | B2 | 4/2017 | Lattanzio |
| 9,909,505 | B2 | 3/2018 | Gallagher |
| 10,087,766 | B2 | 10/2018 | Pope |
| 10,399,664 | B2 | 9/2019 | Bowden |
| 10,408,072 | B2 | 9/2019 | Bielek |
| 10,760,428 | B2 * | 9/2020 | Kray ........................ F01D 5/288 |
| 10,815,886 | B2 | 10/2020 | Kroger |
| 10,844,725 | B2 | 11/2020 | Pouzadoux et al. |
| 10,913,133 | B2 | 2/2021 | Bales |
| 11,131,314 | B2 | 9/2021 | Welch |
| 11,655,768 | B2 | 5/2023 | Sibbach |
| 11,725,526 | B1 | 8/2023 | Sibbach |
| 11,739,689 | B2 | 8/2023 | Sibbach |
| 12,158,082 | B2 | 12/2024 | Kray |
| 12,326,154 | B2 | 6/2025 | Kray |
| 12,345,174 | B1 | 7/2025 | Twahir |
| 12,345,177 | B2 | 7/2025 | Kray |
| 2014/0112796 | A1 | 4/2014 | Kray |
| 2015/0151485 | A1 | 6/2015 | Godon et al. |
| 2016/0010468 | A1 | 1/2016 | Kray |
| 2019/0234420 | A1 | 8/2019 | Bryant, Jr. |
| 2021/0108572 | A1 | 4/2021 | Arif |
| 2021/0324751 | A1 | 10/2021 | Theertham et al. |
| 2021/0388726 | A1 * | 12/2021 | Churcher .............. F04D 29/023 |
| 2022/0362856 | A1 | 11/2022 | Suchel |
| 2023/0003133 | A1 | 1/2023 | Gondre |
| 2023/0060010 | A1 | 2/2023 | Sibbach |
| 2023/0258134 | A1 | 8/2023 | Sibbach |
| 2023/0407754 | A1 | 12/2023 | De Carne-Carnavalet et al. |
| 2025/0198294 | A1 | 6/2025 | Love |
| 2025/0207513 | A1 | 6/2025 | Hoshi |

FOREIGN PATENT DOCUMENTS

| | | | |
|---|---|---|---|
| EP | 4417789 | A1 | 8/2024 |
| FR | 3102378 | A1 | 4/2021 |
| FR | 3116560 | A1 | 5/2022 |
| FR | 3153280 | A1 | 3/2025 |

* cited by examiner

TURBINE ENGINE WITH COMPOSITE AIRFOILS

CROSS-REFERENCE TO RELATED APPLICATIONS

This application is a continuation of U.S. application Ser. No. 18/777,725, filed Jul. 19, 2024, now U.S. Pat. No. 12,326,155, which issued on Jun. 10, 2025, which is a continuation-in-part of U.S. application Ser. No. 18/741, 419, filed Jun. 12, 2024, now U.S. Pat. No. 12,326,154, which issued on Jun. 10, 2025, which is a continuation-in-part of U.S. application Ser. No. 18/171,533, filed Feb. 20, 2023, now U.S. Patent No. 12,158,082, issued on Dec. 3, 2024, all of which are incorporated herein by reference in their entirety.

TECHNICAL FIELD

The disclosure generally relates to a component for a turbine engine, more specifically, to a composite airfoil.

BACKGROUND

Composite materials typically include a fiber-reinforced matrix and exhibit a high strength-to-weight ratio. Due to the high strength-to-weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
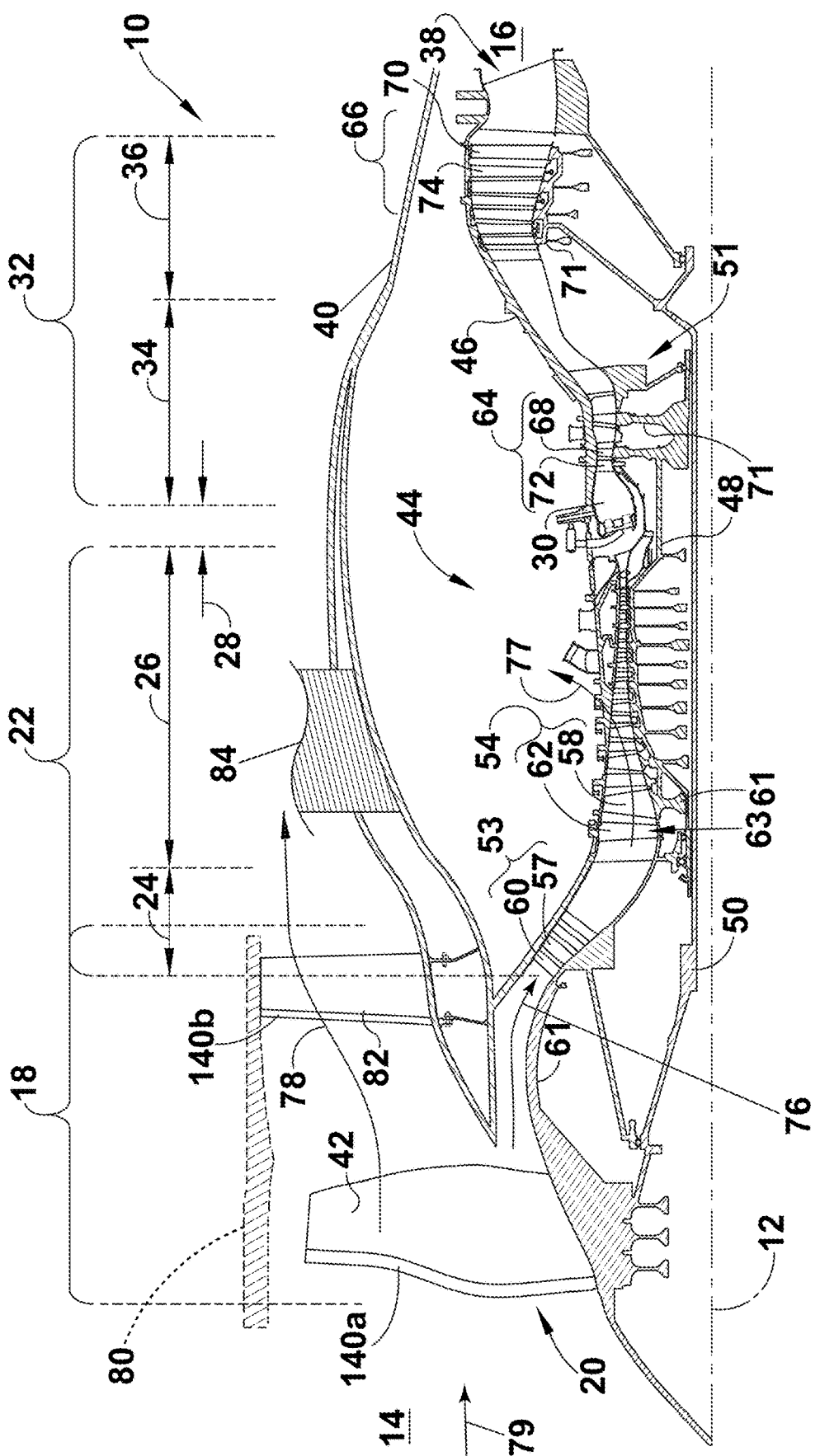
FIG. 1 is a schematic cross-sectional view of a turbine engine in accordance with an exemplary embodiment of the present disclosure.

Aspects of the disclosure herein are directed to a plurality of composite airfoil stages. For purposes of illustration, the present disclosure will be described with respect to the plurality of composite airfoil stages within an engine being a first stage of airfoils in the form of fan blades and a second stage of airfoils immediately downstream the first stage of airfoils as an outlet guide vane (OGV). While fan blades and OGVs are illustrated, it should be understood that any consecutive sets of stages are contemplated. Further, it will be understood, that aspects of the disclosure herein are not so limited and may have general applicability within an engine, including compressors, as well as in non-aircraft applications, such as other mobile applications and non-mobile industrial, commercial, and residential applications.

Reference will now be made in detail to composite fan blades and composite OGVs, one or more examples of which are illustrated in the accompanying drawings. The detailed description uses numerical and letter designations to refer to features in the drawings.

The term "composite," as used herein is, is indicative of a material that does not include metal material. A composite can be a combination of at least two or more non-metallic elements or materials. Examples of a composite material can be, but not limited to, a polymer matrix composite (PMC), a ceramic matrix composite (CMC), carbon fibers, a polymeric resin, a thermoplastic, bismaleimide (BMI), a polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds, and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, with regard to a turbine engine, forward refers to a position closer to an engine inlet and aft refers to a position closer to an engine nozzle or exhaust.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a," "an," and "the" include plural references unless the context clearly dictates otherwise. Furthermore, as used herein, the term "set" or a "set" of elements can be any number of elements, including only one.

Leading length or "LL" as used herein refers to a length between a leading edge of the airfoil and a seam between a leading edge protector and a portion of the airfoil.

First leading length or "FLL" as used herein refers to the leading length of a first stage of airfoils.

Second leading length or "SLL" as used herein refers to the leading length of a second stage of airfoils immediately downstream from the first stage of airfoils.

Chord length or "CL" as used herein refers to a length between a leading edge of the airfoil and a trailing edge of the airfoil.

First chord length or "FCL" as used herein refers to the chord length of the first stage of airfoils.

Second chord length or "SCL" as used herein refers to the chord length of the second stage of airfoils.

Airfoil protection factor or "APF" as used herein refers to a relationship in the form of a ratio of the leading length to the chord length of the airfoil. As more protection is provided for any given airfoil, the leading length increases and in turn so does the APF.

Stage performance factor or "SPF" as used herein refers to a relationship in the form of a ratio of the airfoil protection factor for the first stage of airfoils, or "APF1" to the airfoil protection factor for the second stage of airfoils, or "APF2".

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain exemplary embodiments of the present disclosure, a turbine engine defining a centerline and a circumferential direction is provided. The turbine engine may generally include a turbomachine and a rotor assembly. The rotor assembly may be driven by the turbomachine. The turbomachine, the rotor assembly, or both may define a substantially annular flow path relative to the centerline of the turbine engine. In certain aspects of the present disclosure, an unducted or open rotor turbine engine includes a set of circumferentially spaced fan blades, which extend, exteriorly, beyond a nacelle encasing or engine core.

The turbine engine includes airfoils in the form of blades and vanes. The airfoils described herein can be a plurality of airfoils provided circumferentially about the centerline or be partially provided about a portion of the centerline. At least one airfoil in the plurality of airfoils includes a protective covering on a leading edge of the airfoil. The protective covering can be a metal covering. The protective covering is referred to herein as leading edge protector.

The leading edge protector can be designed for various flight conditions, including take off, descent, and idle. The objective, when designing an airfoil, specifically a composite fan blade and a composite outlet guide vane can be generally stated as balancing an added weight component from the protective covering, or sheath, on the leading edge with an acceptable amount of protection of the leading edge. The balancing of efficient weight designs can be particularly important in large turbofan applications of traditional direct drive, gear-reduction designs, and open-rotor designs. Key factors to consider include that the ratio of the leading edge chord to the blade chord is a balance between the leading edge dominating the response to a bird ingestion or similar event, and the PMC airfoil dominating the characteristics of the blade aerodynamics in normal operation.

There is a tradeoff between the percent of the airfoil chord that is covered by the leading edge protector, and the performance of the airfoil. The protective covering provides a stiffness to the airfoil for bird ingestion, but the remainder of the blade is desirable to be flexible for aerodynamic purposes. Because the fan blade rotates and the OGV is stationary the dynamics of a bird ingestion event differs for the two airfoils.

The inventors have determined that the leading edge protector must overlap with enough of the composite airfoil in order to provide a strong enough bond, but it is desirable to minimize the overlap in order for the composite blade to flex. The leading edge protector also provides erosion protection to a composite airfoil and is required for both static and rotating airfoils. The leading edge protector characteristics have been developed from multiple tests and simulation analyses covering the ingestion of birds of varying sizes at varying span positions, and analysis of blades that have been returned for repair following bird strikes in revenue service. Furthermore, the OGV is not rotating, and experiences a different stress when impacted by a bird after it has passed through the fan. Multiple simulations and analyses depending on how the bird strikes the fan, whether it hits directly centered on a leading edge protector or hits between two adjacent blades where it is more likely to pass through without being sliced into smaller pieces. The relationship between the percent chord of a rotating and non-rotating blade that is covered by the leading edge protector is not obvious due to the difference in the forces acting upon the airfoils when struck by a bird or similar object.

The inventors' practice has proceeded in the manner of designing airfoil stages, modifying the airfoil stages with the addition of the leading edge protector, and redesigning the airfoil stages with the leading edge protector meeting protection requirements associated with the airfoil stages. After calculating and checking an amount of protection provided and an amount of weight increase or decreases associated with the leading edge protector, the process is repeated for other stages of during the design of several different types of turbomachines, such as those shown in FIG. 1. In other words, an airfoil design can meet performance requirements for one location in the engine, but not necessarily for another location.

FIG. 1 is a schematic cross-sectional diagram of a turbine engine 10 for an aircraft. By way of non-limiting example, the turbine engine 10 is illustrated as an open rotor turbine engine. The turbine engine 10 has a generally longitudinally extending axis or engine centerline 12 extending from a forward end 14 to an aft end 16. The turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a nacelle 40, of the turbine engine 10 extends from the forward end 14 of the turbine engine 10 toward the aft end 16 of the turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the turbine engine 10, specifically, the fan section 18 extends radially outward from the nacelle 40. The fan section 18 includes a set of fan blades 42, and a set of outlet guide vanes (OGV) 82 downstream the set of fan blades 42, both disposed radially about the engine centerline 12. The turbine engine 10 includes any number of one or more sets of rotating blades or propellers (e.g., the set of fan blades 42) disposed upstream of a set of stationary fan vanes (e.g., the set of OGVs 82). As a non-limiting example, the turbine engine 10 can include multiple sets of rotating blades and stationary vanes. The set of fan blades 42 can include a first leading edge protector 140a and the set of OGVs 82 can include a second leading edge protector 140b. As such, the turbine engine 10 is further defined as an unducted single-fan turbine engine. The turbine engine 10 is further defined by the location of the fan section 18 with respect to the combustion section 28. The fan section 18 can be upstream, downstream, or in-line with the axial positioning of the combustion section 28. In some aspects of the disclosure herein, the turbine engine can include a fan casing 80 (shown in dotted line) surrounding the fan 20 to define a ducted turbine engine.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the turbine engine 10.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The HP spool 48 and the LP spool 50 are rotatable about the engine centerline 12 and couple to a set of rotatable elements, which collectively define a rotor 51.

It will be appreciated that the turbine engine 10 is either a direct drive or an integral drive engine utilizing a reduction gearbox coupling the LP shaft or spool 50 to the fan 20.

The LP compressor 24 and the HP compressor 26, respectively, include a set of compressor stages 53, 54, in which a set of compressor blades 57, 58 rotate relative to a corresponding set of static compressor vanes 60, 62 (also called a nozzle) to compress or pressurize the stream of fluid passing through the stage. In a single compressor stage 53, 54, multiple compressor blades 57, 58 are provided in a ring and extend radially outward relative to the engine centerline 12, from a blade platform to a blade tip, while the corresponding static compressor vanes 60, 62 are positioned upstream of and adjacent to the compressor blades 57, 58. It is noted that the number of blades, vanes, and compressor stages shown in FIG. 1 were selected for illustrative purposes only, and that other numbers are possible.

The compressor blades 57, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outward relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine are mounted to a disk 71, which is mounted to the corresponding one of the HP and LP spools 48, 50, with each stage having a dedicated disk 71. The static turbine vanes 72, 74 for a stage of the compressor are mounted to the engine casing 46 in a circumferential arrangement. The compressor blades 57, 58 and the turbine blades 68, 70 described herein can be part of a blisk, rather than being mounted to a disk.

Complementary to the rotor portion, the stationary portions of the turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the turbine engine 10.

The nacelle 40 is operatively coupled to the turbine engine 10 and covers at least a portion of the engine core 44, the engine casing 46, or the exhaust section 38. At least a portion of the nacelle 40 extends axially forward or upstream the illustrated portion. For example, the nacelle 40 extends axially forward such that a portion of the nacelle 40 overlays or covers a portion of the fan section 18 or a booster section (not illustrated) of the turbine engine 10. A pylon 84 mounts the turbine engine 10 to an exterior structure (e.g., a fuselage of an aircraft, a wing, a tail wing, etc.).

During operation of the turbine engine 10, a freestream airflow 79 flows against a forward portion of the turbine engine 10. A portion of the freestream airflow 79 becomes an inlet airflow 78. The inlet airflow 78 flows through the set of fan blades 42 and over the nacelle 40 of the turbine engine 10. Subsequently, the inlet airflow 78 flows over at least a portion of the set of OGVs 82, which directs the inlet airflow 78 such that it is transverse toward the engine centerline 12. The inlet airflow 78 then flows past the set of OGVs 82, following the curvature of the nacelle 40 and toward the exhaust section 38.

A portion of the freestream airflow 79 enters the engine core 44 after flowing through the set of fan blades 42 and is described as a working airflow 76, which is used for combustion within the engine core 44. More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the turbine engine 10.

The working airflow 76 and at least some of the inlet airflow 78 merge downstream of the exhaust section 38 of the turbine engine 10. The working airflow 76 and the inlet airflow 78, together, form an overall thrust of the turbine engine 10.

It is contemplated that a portion of the working airflow 76 is drawn as bleed 77 air (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
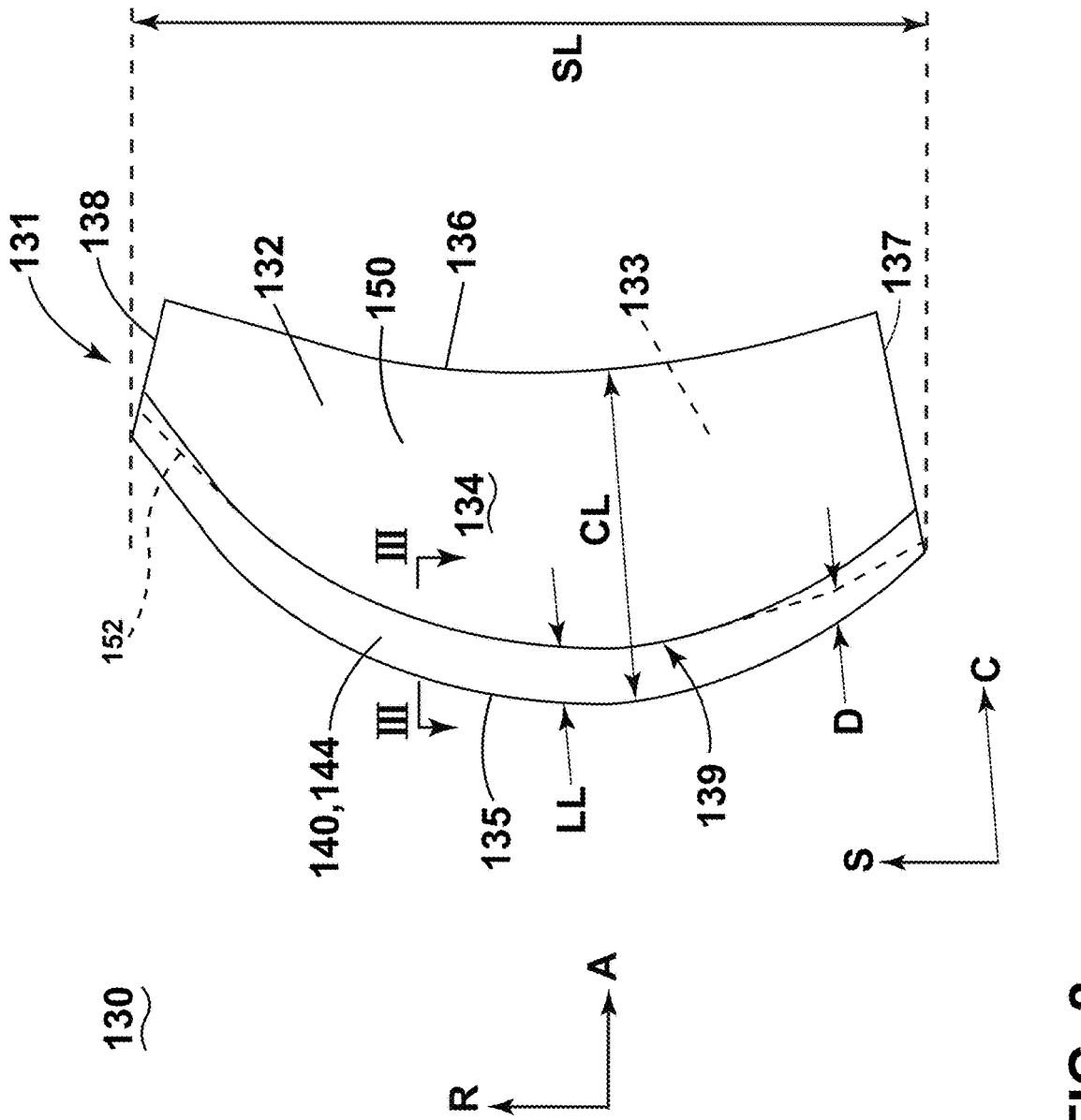
FIG. 2 is a schematic illustration of a composite airfoil in the form of a fan blade for the turbine engine of FIG. 1 according to an exemplary embodiment of the present disclosure.

FIG. 2 is schematic illustration of a composite airfoil 130 in the form of, by way of non-limiting example, a fan blade 131. The fan blade 131 can be, by way of non-limiting example, a blade of the set of fan blades 42 or a blade from the compressor blades 57, 58 or the turbine blades 68, 70. Further, the composite airfoil 130 can be a vane of the set of OGVs 82 or a vane of the static vanes 60, 62, 72, 74. It is contemplated that the composite airfoil 130 can be a blade, vane, airfoil, or other component of any turbine engine, such as, but not limited to, a gas turbine engine, a turboprop engine, a turboshaft engine, or a turbofan engine.

The composite airfoil 130 can include a wall 132 bounding an interior 133. The wall 132 can define an exterior surface 134 extending radially between a leading edge 135 and a trailing edge 136 to define a chordwise direction (denoted "C"). The composite airfoil 130 has a chord length (denoted "CL") measured along the chordwise direction C between the leading edge 135 and the trailing edge 136. The exterior surface 134 can further extend between a root 137 and a tip 138 to define a spanwise direction (denoted "S"). The composite airfoil 130 has a span length (denoted "SL") measured along the spanwise direction S between the root 137 and the tip 138 where the root is considered 0% of the span length SL and the tip 138 is considered 100% of the span length SL. The span length SL is the maximum distance between the root 137 and the tip 138 of the composite airfoil 130. It will be understood that the composite airfoil 130 can take any suitable shape, profile, or form including that the leading edge 135 need not be curved.

An axial direction (denoted "A") extends generally across the page from right to left. The axial direction A is parallel to the engine centerline 12 (FIG. 1). A radial direction (denoted "R") extends perpendicularly away from the axial direction A. It should be understood that the spanwise direction S is parallel to the radial direction R. The chordwise direction C can extend generally along the axial direction A, however with more bend in the composite airfoil 130, it should be understood that the chordwise direction C can extend both into and out of the page and across the page from left to right.

The exterior surface 134 is defined by a leading edge protector 140 and a composite portion 150. A seam 139, separates the leading edge protector 140 from the composite portion 150 along the exterior surface 134. The leading edge protector 140 extends along the chordwise direction C between the leading edge 135 and the seam 139 to define a leading length (denoted "LL").

The leading edge protector 140 is typically a metallic leading edge protector and can be made of, but is not limited to, steel, aluminum, refractory metals such as titanium, or superalloys based on nickel, cobalt, or iron. It should be understood that the leading edge protector 140 for the fan blade 131 can be a metallic leading edge protector while a set of stationary vanes downstream from the fan blade 131, by way of non-limiting example the set of OGVs 82 (FIG. 1), have the second leading edge protector 140b (FIG. 1) made of a polyurethane material. Further, the leading edge protectors 140, 140a, 140b described herein can be any suitable material such as metal, thermoplastic, or polyurethane, where both are the same, or different.

The composite portion 150 can include a composite leading edge 152 spaced a distance (denoted "D") from the leading edge 135. The composite leading edge 152 can define at least a portion of, or all of the seam 139. It is further contemplated that at least a part of the leading edge protector 140 overlaps the composite portion 150 such that at least a portion of, illustrated in dashed line, or all of the composite leading edge 152 is located upstream from the seam 139. In other words, the leading edge protector 140 can define a sheath 144 on the composite leading edge 152.

The composite portion 150 can be made of one or more layers of material. The one or more layers of material can be applied during the same stage or different stages of the manufacturing of the composite airfoil 130. By way of non-limiting example, composite portion 150 can include at least a polymer matrix composite (PMC) portion or a polymeric portion. The polymer matrix composite can include, but is not limited to, a matrix of thermosets (epoxies, phenolics) or thermoplastic (polycarbonate, polyvinyl-chloride, nylon, acrylics) and embedded glass, carbon, steel, or Kevlar fibers.

The leading edge protector 140 and the composite portion 150 can be formed by a variety of methods, including additive manufacturing, casting, electroforming, or direct metal laser melting, in non-limiting examples. As used herein, an "additively manufactured" component refers to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

It will be shown herein that a relationship between the leading length LL and the chord length CL can be referred to herein as an airfoil protection factor or simply as "APF." In other words, for any given composite airfoil 130 having a predetermined chord length CL, an amount of coverage provided by the leading edge protector 140 increases, so does the leading length LL and in turn the APF.

Figure 3:
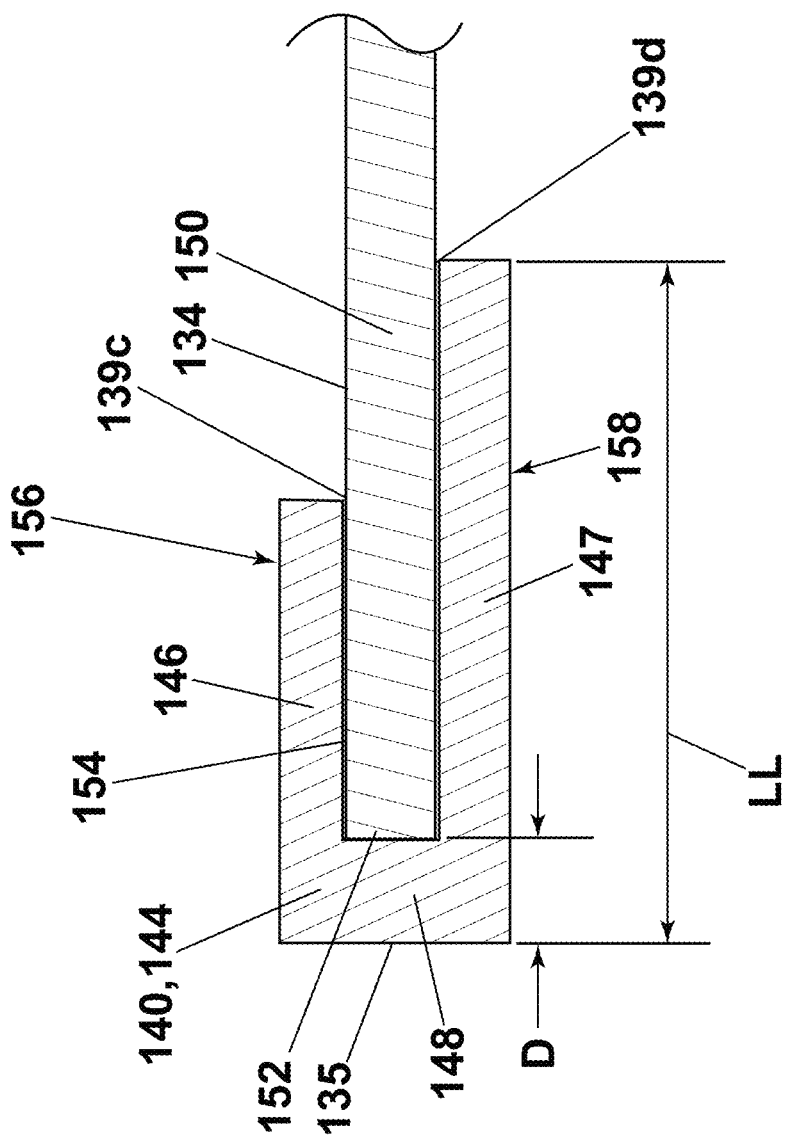
FIG. 3 is a schematic cross-section taken along line III-III of FIG. 2.

FIG. 3 is a schematic cross-section taken along line III-III of FIG. 2. The leading edge protector 140 is the sheath 144 with a first wall 146, a second wall 147, and a third wall 148 interconnecting the first wall 146 and the second wall 147. The first wall 146, second wall 147, and third wall 148 of the leading edge protector 140 are oriented and shaped such that they define a generally U-shaped (or C-shaped) channel 154 therebetween. As shown in FIG. 3 and as will be discussed below, the channel 154 is sized and shaped to receive the composite leading edge 152 of the composite portion 150. Notably, the shape of the channel 154 is shown by way of example only and the channel 154 is not limited to this specific shape and is not drawn to scale.

The composite airfoil 130 can extend between a first side 156 and a second side 158. The seam 139 can be two seams 139c, 139d at corresponding ends of the channel 154. The leading length LL is measured from the leading edge 135 to the seam 139d furthest from the leading edge 135. While illustrated at two different locations, it should be understood that the seams 139c, 139d can be located at the same leading length LL. While illustrated as rectangular blunt ends at the seam 139, the leading edge protector 140 can taper such that the leading edge protector 140 and the composite portion 150 are flush to define the exterior surface 134.

Figure 4:
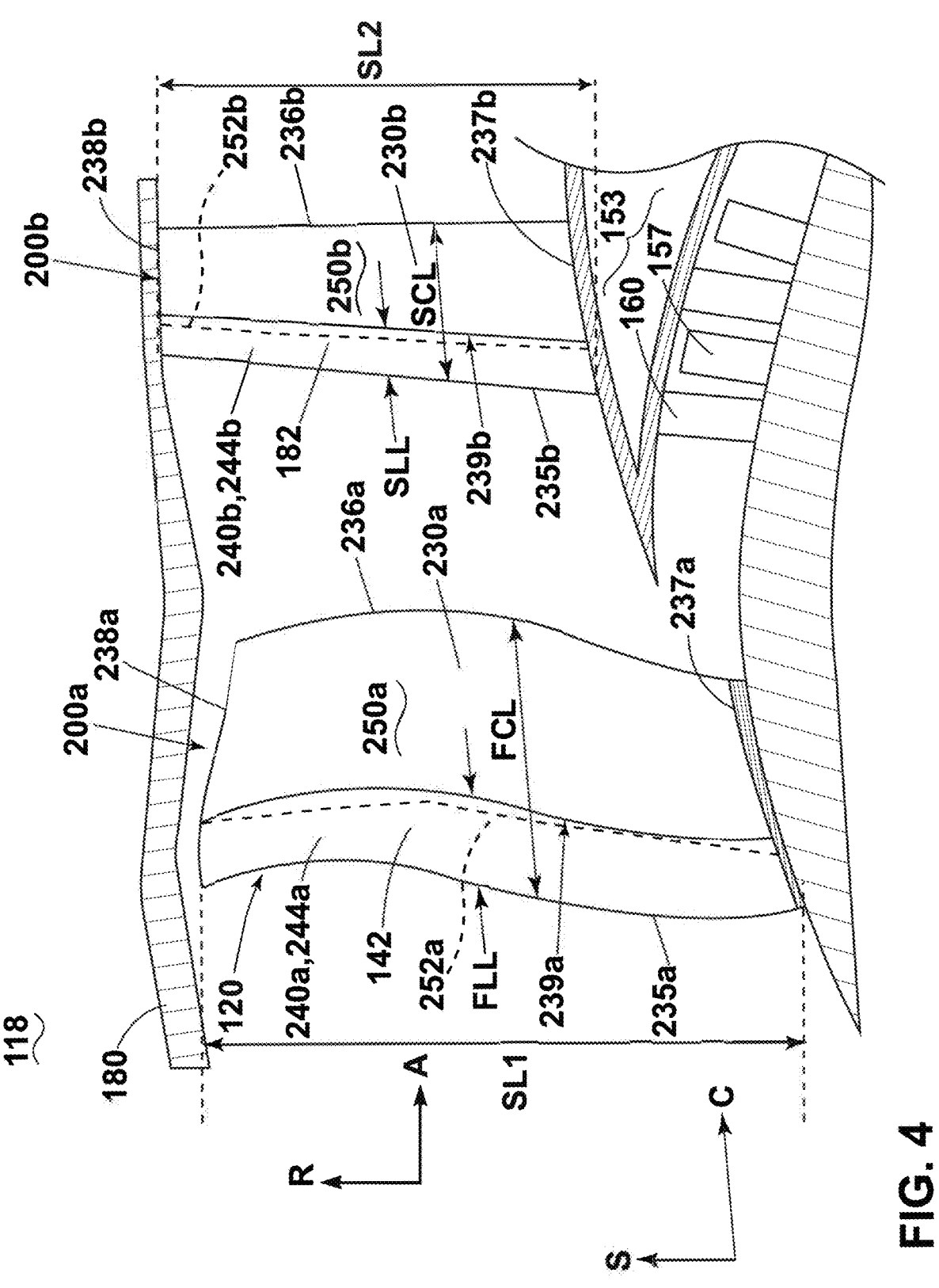
FIG. 4 is a schematic enlarged view of an exemplary fan section for the turbine engine of FIG. 1 according to an exemplary embodiment of the present disclosure.

FIG. 4 is schematic enlarged view of a fan section 118 similar to fan section 18 therefore, like parts of the fan section 118 (FIG. 1) will be identified with like numerals increased by 100, with it being understood that the description of the like parts of the fan section 18 applies to the fan section 118, except where noted.

A set of compressor stages 153 include a set of compressor blades 157 rotating relative to a corresponding set of static compressor vanes 160. A set of fan blades 142 define a fan section 118 including a fan 120. The turbine engine can include a fan casing 180 surrounding the fan 120.

The set of fan blades 142 defines a first stage of airfoils 200a within the fan section 118 (FIG. 1). A first airfoil 230a in the first stage of airfoils 200a is similar to the previously described airfoil 130, therefore like parts of the first airfoil 230a will be identified with like numerals increased by 100 and having a notation "a" with it being understood that the description of the like parts of the airfoil 130 applies to the first airfoil 230a, except where noted. While only a single fan blade is shown in the cross-section it will be understood that that the set of fan blades 142 are included and spaced about the fan section 118.

The first airfoil 230a has a first span length (denoted "SL1") measured along the spanwise direction S between a first root 237a and a first tip 238a where the first root 237a is considered 0% of the first span length SL1 and the first tip 238a is considered 100% of the first span length SL1. The first span length SL1 is the maximum distance between the first root 237a and the first tip 238a of the first airfoil 230a.

A first leading edge protector 240a extends along the chordwise direction C between a first leading edge 235a and a first seam 239a to define a first leading length (denoted "FLL"). The first airfoil 230a has a first chord length (denoted "FCL") measured along the chordwise direction C between the first leading edge 235a and the first trailing edge 236a.

A relationship between the first leading length (FLL) and the first chord length (FCL) is denoted herein with a first expression of the APF:

$$APF1 = \frac{FLL}{FCL} \qquad (1)$$

OGVs 182 define a second stage of airfoils 200*b* downstream from the first stage of airfoils 200*a*. A second airfoil 230*b* in the second stage of airfoils 200*b* is similar to the previously described airfoil 130, therefore like parts of the second airfoil 230*b* will be identified with like numerals increased by 100 and having a notation "b" with it being understood that the description of the like parts of the airfoil 130 applies to the second airfoil 230*b*, except where noted. The second airfoil 230*b* is located downstream from the first airfoil 230*a*. While only a single outlet guide vane 182 is shown in the cross-section it will be understood that the OGVs 182 are multiple OGVs spaced about the fan section 118.

A second leading edge protector 240*b* extends along the chordwise direction C between a second leading edge 235*b* and a second seam 239*b* to define a second leading length (denoted "SLL"). The second airfoil 230*b* has a second chord length (denoted "SCL") measured along the chordwise direction C between the second leading edge 235*b* and second trailing edge 236*b*.

The second airfoil 230*b* has a second span length (denoted "SL2") measured along the spanwise direction S between a second root 237*b* and a second tip 238*b* where the second root 237*b* is considered 0% of the second span length SL2 and the second tip 238*b* is considered 100% of the second span length SL2. The second span length SL2 is the maximum distance between the second root 237*b* and the second tip 238*b* of the second airfoil 230*b*.

The first and second leading edge protectors 240*a*, 240*b* can each define first and second sheaths 244*a*, 244*b*. An exterior surface of each airfoil 230*a*, 230*b* is defined by the corresponding leading edge protectors 240*a*, 240*b* and a corresponding composite portion 250*a*, 250*b*. The composite portions 250*a*, 250*b* can each include a corresponding composite leading edge 252*a*, 252*b* which can define at least a portion of, or all of the corresponding seams 239*a*, 239*b*.

A relationship between the second leading length (SLL) and the second chord length (SCL) is denoted herein with a second expression of the APF:

$$APF2 = \frac{SLL}{SCL} \quad (2)$$

As will be further discussed herein, the APF describes an amount of protection coverage by the leading edge protector of any of the airfoils 130, 230*a*, 230*b* described herein. A balance trade-off between the amount of protection and the weight gain/loss associated with any of the protector portions described herein can be expressed by an APF value of from 0.1 to 0.3, inclusive of endpoints. In other words, to satisfy protection requirements the leading edge protector described herein should protect at least 10% and up to and including 30% of the composite airfoil before becoming too heavy.

The first stage of airfoils 200*a* has a first number of airfoils and the second stage of composite airfoils 200*b* has a second number of airfoils different than the second number. In other words, the consecutive stages of airfoils can vary in size and number of airfoils. Further, the first stage of composite airfoils 200*a* and the second stage of composite airfoils 200*b* can both be configured to rotate.

It will be appreciated that the number, size, and configuration of the composite airfoils described herein are provided by way of example only and that in other exemplary embodiments, the composite airfoils may have any other suitable configuration including that the plurality of airfoils may be in multiple rotor stages, etc.

As described earlier, finding a workable solution that balances the amount of protective covering for the composite airfoil as described herein whilst maintaining a weight requirement is a labor-intensive and time-intensive process, because the process is iterative and involves the selection of multiple composite airfoils with various protector edge lengths and chord lengths. Design procedures require placing said composite airfoil 130 (FIG. 2) into a turbine engine designed for a first flight operating condition and embodying a protection effectiveness with acceptable weight gain/losses for that first flight operating condition. Evaluating whether in a second, third, or other flight operating condition, the same selected composite airfoil 130 maintains a heat effectiveness with acceptable protection effectiveness for the other operating conditions is time-intensive and necessitates re-design of the composite airfoil and even the turbine engine in the event the conditions are not met. It is desirable to have an ability to arrive at an optimal composite airfoil, like the composite airfoil(s) described herein, rather than relying on chance. It would be desirable to have a limited or narrowed range of possible composite airfoil configurations for satisfying mission requirements, such requirements including protection, weight restrictions, heat transfer, pressure ratio, and noise transmission level requirements, as well as the ability to survive bird strikes at the time a composite airfoil 130 is selected and located within an engine.

The inventor(s) sought to find the trade-off balance between leading edge protection and weight gain/loss while satisfying all design requirements, because this would yield a more desired composite airfoil suited for specific needs of the engine, as described above. Knowing these trade-offs is also a desirable time saver.

TABLE 1 below illustrates some composite airfoil configurations that yielded workable solutions to the trade-off balance problem.

TABLE 1

| Example: | 1 | 2 | 3 | 4 | 5 | 6 |
|---|---|---|---|---|---|---|
| CL (cm) | 47 | 11 | 29 | 60 | 9.7 | 13 |
| LL (cm) | 11 | 1.7 | 3.2 | 16 | 1.5 | 2.3 |
| SL (%) | 20 | 20 | 38 | 50 | 50 | 80 |

It was discovered, unexpectedly, during the course of engine design and the time-consuming iterative process previously described, that a relationship exists between the ratio of the leading length LL to the chord length CL. It has been found that the optimal amount of protective covering of the composite airfoil lies within a specific range based on the leading length LL of the protective covering and the chord length CL of the composite airfoil.

TABLE 2 below illustrates some consecutive composite airfoil stages with workable solutions to the trade-off balance problem. Different span percentages are shown in TABLE 2. It was found that the CL and LL should be taken for any position between 20% and 80%, inclusive of end points of the span length SL. The specific range of the span length was chosen because the airfoil may have different properties, profiles, etc. at its distal ends. In the non-limiting examples, the fan blade dimensions determine APF1 while the outlet guide vane dimensions determined APF2.

TABLE 2

| Outlet Guide Vane | | | | | |
|---|---|---|---|---|---|
| Fan Blade | | | Outlet Guide Vane | | |
| Span (%) | CL (cm) | LL (cm) | Span (%) | CL (cm) | LL (cm) |
| 20 | 46.9 | 11.2 | 20 | 31.4 | 3.18 |
| 24 | 48.3 | 11.6 | 26 | 30.6 | 3.18 |
| 28 | 50.5 | 13.6 | 32 | 30.0 | 3.18 |
| 32 | 52.4 | 14.2 | 38 | 29.3 | 3.18 |
| 36 | 54.5 | 14.6 | 44 | 28.7 | 3.18 |
| 40 | 56.5 | 15.0 | 50 | 28.1 | 3.18 |
| 44 | 58.2 | 15.3 | 56 | 27.5 | 3.18 |
| 48 | 59.4 | 15.5 | 62 | 26.9 | 3.18 |
| 52 | 60.1 | 15.7 | 68 | 26.6 | 3.18 |
| 56 | 60.6 | 15.6 | 74 | 26.7 | 3.18 |
| 60 | 61.0 | 15.7 | 80 | 27.4 | 3.18 |
| 64 | 61.5 | 15.5 | | | |
| 68 | 61.9 | 15.4 | | | |
| 72 | 65.0 | 15.4 | | | |
| 76 | 63.2 | 15.5 | | | |
| 80 | 64.4 | 15.7 | | | |

Moreover, utilizing this relationship, the inventor found that the number of suitable or feasible composite airfoil possibilities for placement in a turbine engine that are capable of meeting the design requirements could be greatly reduced, thereby facilitating a more rapid down-selection of composite airfoils to consider as an engine is being developed. Such benefit provides more insight to the requirements for a given engine, and to the requirements for particular composite airfoil locations within the engine, long before specific technologies, integration, or system requirements are developed fully. The discovered relationship also avoids or prevents late-stage redesign while also providing the composite airfoil with a required protection effectiveness within given weight parameters.

More specifically, the inventors found that a relationship between the first expression of the APF, APF1, and the second expression of the APF, APF2, optimizes the protection amount for successive stages of airfoils. This relationship was an unexpected discovery during the course of engine design—i.e., designing multistage airfoil sections such as by way of non-limiting examples fan sections, fan blades, and outlet guide vanes and evaluating the impact that an amount of protection on the fan blade has on a needed amount of protection on the outlet guide vane, or vice versa. Narrowing the options down based on surrounding stages of airfoils can significantly decrease both material and time costs.

In other words, an amount of protection provided by the first leading edge protector 240a on the first airfoil 230a can affect an amount of protection necessary for the second airfoil 230b downstream of the first airfoil 230a. This relationship between the multistage airfoils or successive airfoils, such as 230a and 230b, can be described by a stage performance factor (denoted "SPF") determined from a relationship between the APF1 and the APF2. The stage performance factor can generally be represented by a ratio of the first airfoil protection factor APF1 to the second airfoil protection factor APF2 represented by:

$$SPF = \frac{APF1}{APF2} \tag{3}$$

More specifically, it was found that for any position between 20% and 80%, inclusive of end points of the span length SL, a desired SPF value is greater than or equal to 0.70 and less than or equal to 4 (0.7≤SPF≤4). The specific range of the span length was chosen because the airfoil may have different properties, profiles, etc. at its distal ends. Conversely, at any position between 20% and 80%, inclusive of end points the airfoil is more uniform and therefore the determined ratios are applicable. It will be understood that because of its position and movement, the rotating fan blade will likely require more coverage from the leading edge protector as compared to a static airfoil or OGV, which is driving the relationship ratio to the 0.7 to 4.0 range. This is due to the fact that the rotating blade has a higher kinetic energy from impact and is driven by the rotating velocity of the airfoil.

Utilizing this relationship, the inventors were able to arrive at a better performing airfoil in terms of protection amount with acceptable weight increase. The inventors found that the SPF for a set first set of airfoils and a second set of airfoils downstream from the first set of airfoils could be narrowed to an SPF range of greater than or equal to 0.95 and less than or equal to 2.5 (0.95≤SPF≤2.5). Narrowing the SPF range provides more insight to the requirements for a given engine well before specific technologies, integration and system requirements are developed fully. For example, as the fan speed is reduced, coverage on the first leading edge 235a by the first leading edge protector can decrease such that the APF1 also decreases. Further, knowing a range for the SPF can prevent or minimize late-stage redesign, decrease material cost, and save time.

The SPF value represents how an amount of protection on a first stage of airfoils, like the first stage of airfoils 200a, impacts an amount of protection necessary for any downstream airfoil stages with respect to the first set of airfoil stages.

In one example, the set of fan blades 142 illustrated in FIG. 4 can have dimensions of the Fan Blade at 20% from TABLE 2 and the set of outlet guide vanes 182 can have dimensions of the Outlet Guide Vane at 20% from TABLE 2. This results in an APF1 value of (11.2/46.9) or 0.24 and an APF2 value of (3.18/31.4) or 0.10. Using the SPF ratio, an SPF value of (0.24/0.10) or 2.40 is found.

In another example, the set of fan blades 142 illustrated in FIG. 4 can have dimensions of the Fan Blade at 68% from TABLE 2 and the set of outlet guide vanes 182 can have dimensions of the Outlet Guide Vane at 68% from TABLE 2. This results in an APF1 value of (15.4/61.9) or 0.25 and an APF2 value of (3.18/26.6) or 0.12. Using the SPF ratio, an SPF value of (0.25/0.12) or 2.1 is found.

Some lower and upper bound values for each design parameter for determining Expression (3) are provided below in TABLE 3:

TABLE 3

| Parameter | Lower Bound | | Upper Bound | |
|---|---|---|---|---|
| SL (%) | 20 | 80 | 20 | 80 |
| | | First Airfoil | | |
| FCL (cm) | 24 | 32 | 56 | 77 |
| FLL (cm) | 6 | 8 | 13 | 19 |
| | | Second Airfoil | | |
| SCL (cm) | 9.9 | 9.3 | 31 | 27 |
| SLL (cm) | 1.6 | 1.5 | 4 | 3.5 |

It was found that first and second airfoil pairs with dimensions fitting in the ranges set out in TABLE 4 below fit into the composite airfoil dimensions previously described herein. These ranges enable a minimum weight gain for a compact and proficiently protected composite airfoils in succession.

TABLE 4

| Ratio | Narrow Range | Broad Range |
|---|---|---|
| SPF | 0.95-2.5 | 0.70-4.0 |
| APF1 | 0.22-0.25 | 0.20-0.30 |
| APF2 | 0.10-0.12 | 0.08-0.17 |

Pairs of first and second airfoils, with the second airfoils downstream of the first airfoils within the ranges provided can be assembled to conform with any fan section, or other downstream stage relationship for blades/vanes and blades/blades. This can include any number of engine designs including ducted and unducted engines as well as a direct-drive configuration and an indirect-drive configuration such as a speed reduction device or a geared-drive configuration.

Figure 5:
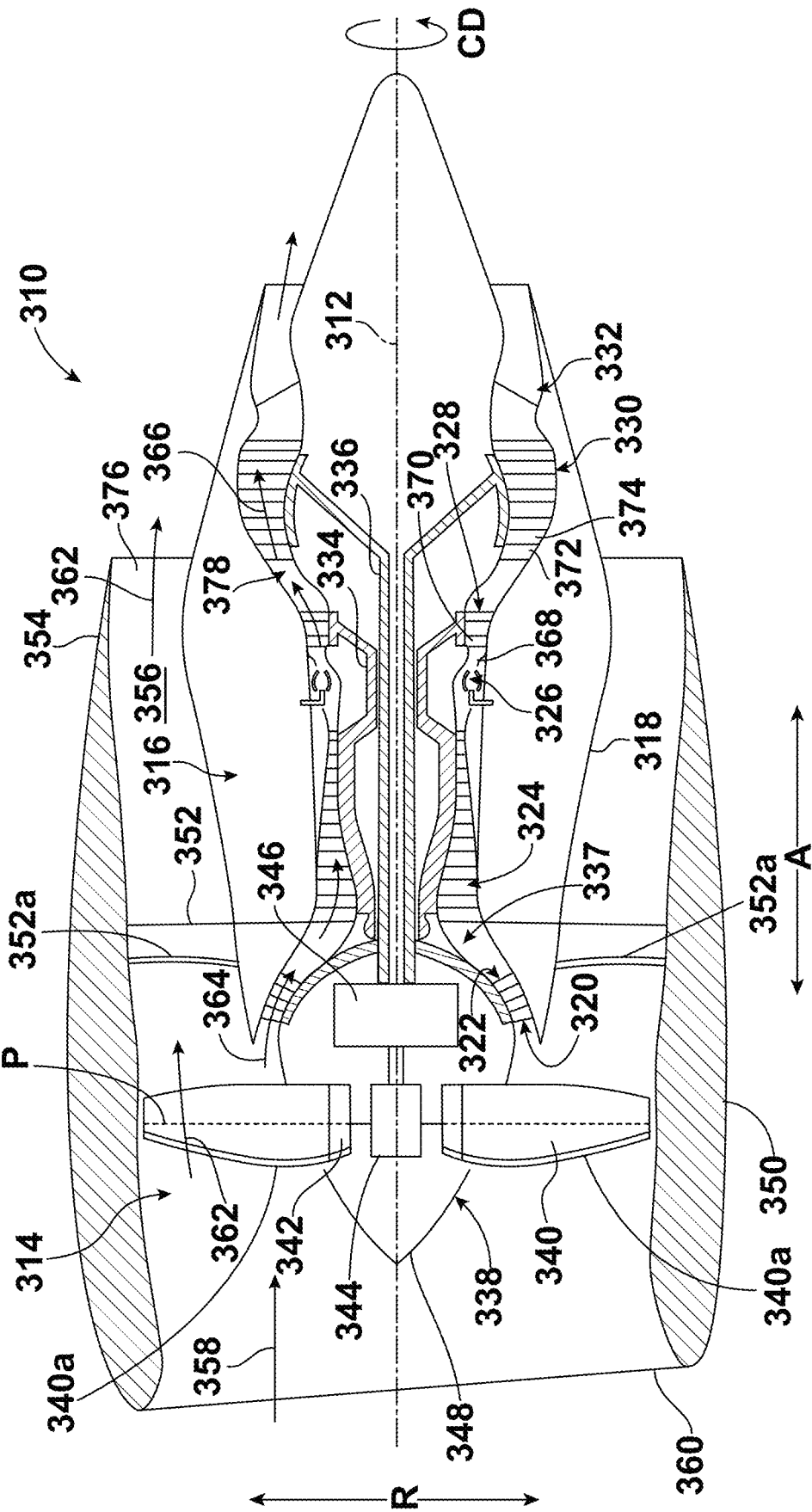
FIG. 5 is a schematic cross-sectional view of a gas turbine engine in accordance with another exemplary embodiment of the present disclosure.

For example, FIG. 5 illustrates a gas turbine engine 310 as a high-bypass turbofan jet engine, sometimes also referred to as a turbofan engine, which can include the set of composite airfoils or first and second stages of composite airfoils as described herein. The gas turbine engine 310 defines an axial direction A (extending parallel to a longitudinal centerline 312 provided for reference), a radial direction R, and a circumferential direction CD extending about the longitudinal centerline 312. In general, the gas turbine engine 310 includes a fan section 314 and a turbomachine 316 disposed downstream from the fan section 314.

The exemplary turbomachine 316 depicted generally includes a substantially tubular outer casing 318 that defines an annular inlet 320. The outer casing 318 encases, in serial flow relationship, a compressor section including a booster or low pressure (LP) compressor 322 and a high pressure (HP) compressor 324, a combustion section 326, a turbine section including a high pressure (HP) turbine 328 and a low pressure (LP) turbine 330, and a jet exhaust nozzle section 332. A high pressure (HP) shaft 334, which may additionally or alternatively be a spool, drivingly connects the HP turbine 328 to the HP compressor 324. A low pressure (LP) shaft 336, which may additionally or alternatively be a spool, drivingly connects the LP turbine 330 to the LP compressor 322. The compressor section, combustion section 326, turbine section, and jet exhaust nozzle section 332 together define a working gas flow path 337.

In the illustrated example, and by way of non-limiting example, the fan section 314 includes a fan 338 having a plurality of fan blades 340 coupled to a disk 342 in a spaced apart manner. As depicted, the fan blades 340 extend outwardly from disk 342 generally along the radial direction R.

Each fan blade 340 is rotatable relative to the disk 342 about a pitch axis P by virtue of the fan blades 340 being operatively coupled to a suitable pitch change mechanism 344 configured to collectively vary the pitch of the fan blades 340, e.g., in unison. The gas turbine engine 310 further includes a speed reduction device in the form of a power gearbox 346, and the fan blades 340, disk 342, and pitch change mechanism 344 are together rotatable about the longitudinal centerline 312 by LP shaft 336 across the power gearbox 346. The power gearbox 346 includes a plurality of gears for adjusting a rotational speed of the fan 338 relative to a rotational speed of the LP shaft 336, such that the fan 338 may rotate at a more efficient fan speed. It will be understood that any suitable speed reduction device configured to adjust the rotation of the fan 338 relative to the LP shaft 336 can be utilized and that a power gearbox is merely one example thereof.

The disk 342 is covered by rotatable front hub 348 of the fan section 314. The front hub 348 is also sometimes referred to as a spinner. The front hub 348 is aerodynamically contoured to promote an airflow through the plurality of fan blades 340.

Additionally, the exemplary fan section 314 includes an annular fan casing or outer nacelle 350 that circumferentially surrounds the fan 338, circumferentially surrounds at least a portion of the turbomachine 316, or a combination thereof. It should be appreciated that the nacelle 350 is supported relative to the turbomachine 316 by a plurality of outlet guide vanes 352, which can be a second stage of airfoils in the non-limiting example. Moreover, a downstream section 354 of the nacelle 350 extends over an outer portion of the turbomachine 316 so as to define a bypass airflow passage 356 therebetween.

It will be understood that each fan blade of the plurality of fan blades 340 may form a composite airfoil and that the plurality of fan blades 340 can form a first stage of airfoils as described above. More specifically, each of the plurality of fan blades 340 can include a first leading edge protector 340a. It will be understood that the plurality of fan blades forming the first stage of airfoils are similar to the previously described airfoils 130 and 230a with it being understood that the description of like parts applies to the plurality of fan blades unless otherwise noted.

Further still, it will be understood that each outlet guide vane of the plurality of outlet guide vanes 352 may form a composite airfoil. Further still, in the illustrated example, the plurality of outlet guide vanes 352 can form a second stage of airfoils as described above. More specifically, each of the plurality of outlet guide vanes 352 can include a second leading edge protector 352a. It will be understood that an outlet guide vane of the plurality of outlet guide vanes 352 forming the second stage of airfoils is similar to the previously described airfoils 130 and 230b with it being understood that the description of like parts applies to the outlet guide vane of the plurality of outlet guide vanes 352 unless otherwise noted.

It will be understood that the plurality of fan blades 340 and the plurality of outlet guide vanes 352 are similar to the previously described first and second airfoil pairs with dimensions fitting in the ranges set out in TABLE 4 above.

During operation of the gas turbine engine 310, a volume of air 358 enters the gas turbine engine 310 through an associated inlet 360 of the nacelle 350 and fan section 314. As the volume of air 358 passes across the fan blades 340, a first portion of air 362 is directed or routed into the bypass airflow passage 356 and a second portion of air 364 as indicated by arrow 364 is directed or routed into the working gas flow path 337, or more specifically into the LP compressor 322. The ratio between the first portion of air 362 and the second portion of air 364 is commonly known as a bypass ratio. A pressure of the second portion of air 364 is then increased as it is routed through the HP compressor 324 and into the combustion section 326, where it is mixed with fuel and burned to provide combustion gases 366.

The combustion gases 366 are routed through the HP turbine 328 where a portion of thermal and/or kinetic energy from the combustion gases 366 is extracted via sequential stages of HP turbine stator vanes 368 that are coupled to the outer casing 318 and HP turbine rotor blades 370 that are coupled to the HP shaft 334, thus causing the HP shaft 334 to rotate, which supports operation of the HP compressor

324. The combustion gases 366 are then routed through the LP turbine 330 where a second portion of thermal and kinetic energy is extracted from the combustion gases 366 via sequential stages of LP turbine stator vanes 372 that are coupled to the outer casing 318 and LP turbine rotor blades 374 that are coupled to the LP shaft 336, thus causing the LP shaft 336 to rotate, which supports operation of the LP compressor 322, rotation of the fan 338, or a combination thereof.

The combustion gases 366 are subsequently routed through the jet exhaust nozzle section 332 of the turbomachine 316 to provide propulsive thrust. Simultaneously, the pressure of the first portion of air 362 is substantially increased as the first portion of air 362 is routed through the bypass airflow passage 356 before it is exhausted from a fan nozzle exhaust section 376 of the gas turbine engine 310, also providing propulsive thrust. The HP turbine 328, the LP turbine 330, and the jet exhaust nozzle section 332 at least partially define a hot gas path 378 for routing the combustion gases 366 through the turbomachine 316.

As previously described, the stages of airfoils exemplary gas turbine engine 310 depicted in FIG. 5 is by way of example only, and that in other exemplary embodiments, the gas turbine engine 310 may have other configurations. For example, although the gas turbine engine 310 depicted is configured as a ducted gas turbine engine (i.e., including the outer nacelle 350, also referred to herein as a turbofan engine), in other embodiments, the gas turbine engine 310 may be an unducted gas turbine engine (such that the fan 338 is an unducted fan, and the outlet guide vanes 352 are cantilevered from the outer casing 318; see, e.g., FIG. 6; also referred to herein as an open rotor engine). Additionally, or alternatively, although the gas turbine engine 310 depicted is configured as a variable pitch gas turbine engine (i.e., including a fan 338 configured as a variable pitch fan), in other embodiments, the gas turbine engine 310 may alternatively be configured as a fixed pitch gas turbine engine (such that the fan 338 includes fan blades 340 that are not rotatable about a pitch axis P).

Figure 6:
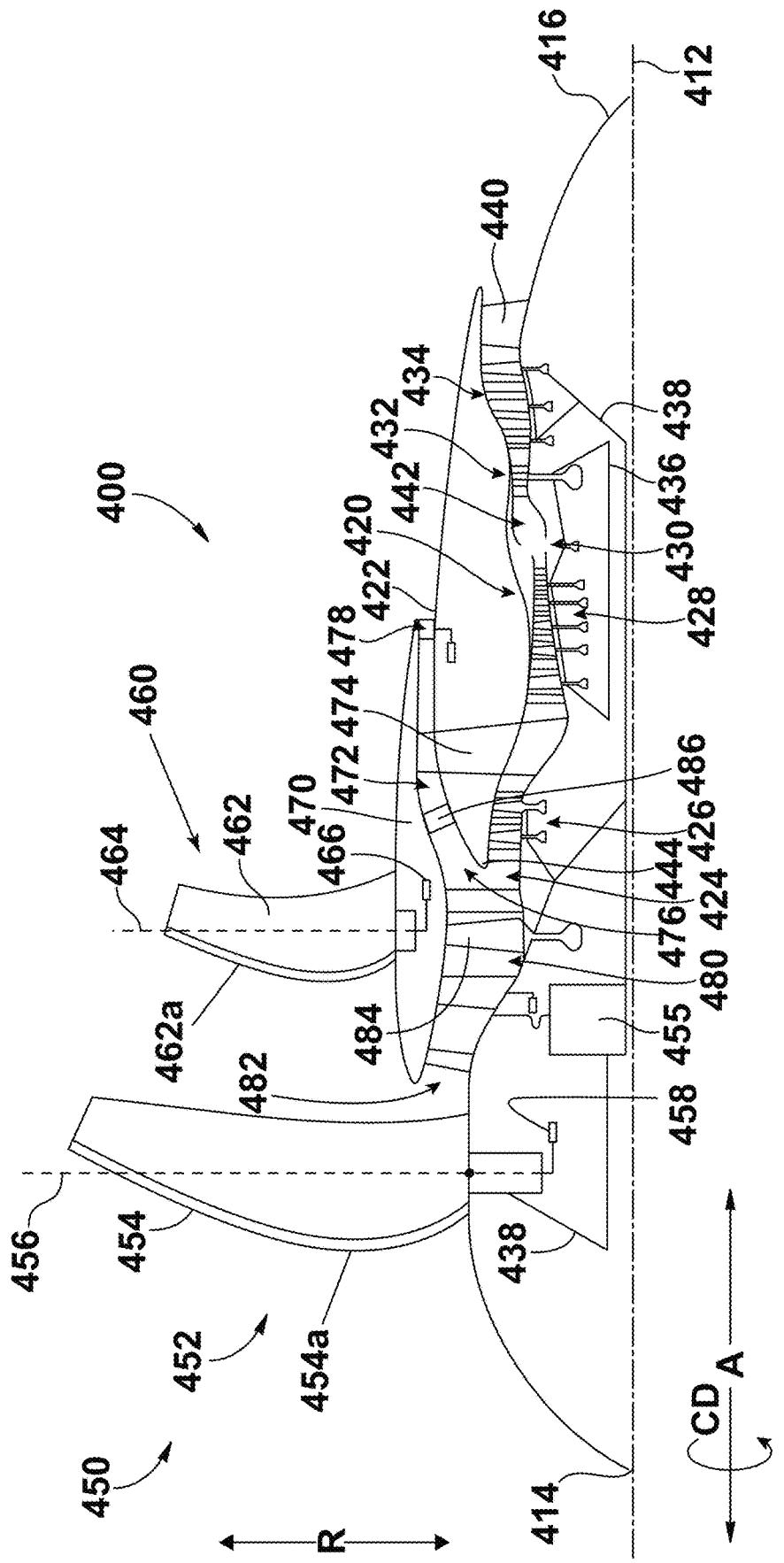
FIG. 6 is a schematic cross-sectional view of a gas turbine engine in accordance with another exemplary embodiment of the present disclosure.

FIG. 6, illustrates another non-limiting example of a gas turbine engine 400, which can include the set of composite airfoils or first and second stages of composite airfoils as described herein. The exemplary gas turbine engine 400 of FIG. 4 may be configured in substantially the same manner as the exemplary gas turbine engine 310 described above with reference to FIG. 5.

For example, the exemplary gas turbine engine 400 defines an axial direction A, a radial direction R, and a circumferential direction CD. Moreover, the engine 400 defines an axial centerline, longitudinal axis, or engine centerline 412 that extends along the axial direction A. In general, the axial direction A extends parallel to the engine centerline 412, the radial direction R extends outward from and inward to the engine centerline 412 in a direction orthogonal to the axial direction A, and the circumferential direction CD extends three hundred sixty degrees (360°) around the engine centerline 412. The engine 400 extends between a forward end 414 and an aft end 416, e.g., along the axial direction A.

Further, the exemplary gas turbine engine 400 generally includes a fan section 450 and a turbomachine 420. Generally, the turbomachine 420 includes, in serial flow order, a compressor section, a combustion section, a turbine section, and an exhaust section. In a non-limiting example, the turbomachine 420 includes a core cowl 422 that defines a core inlet 424 that is annular. The core cowl 422 further encloses at least in part a low pressure system and a high pressure system. For example, the core cowl 422 depicted encloses and supports at least in part a booster or low pressure ("LP") compressor 426, a high pressure ("HP") compressor 428, a combustor 430, a high pressure turbine 432, and a low pressure turbine 434. The high pressure turbine 432 drives the HP compressor 428 through a high pressure shaft 436. The low pressure turbine 434 drives the low pressure compressor 426 and components of the fan section 450 through a low pressure shaft 438. After driving each of the high pressure turbine 432 and the low pressure turbine 434, combustion products exit the turbomachine 420 through a turbomachine exhaust nozzle 440.

In this manner, the turbomachine 420 defines a working gas flow path or core duct 442 that extends between the core inlet 424 and the turbomachine exhaust nozzle 440. The core duct 442 is an annular duct positioned generally inward of the core cowl 422 along the radial direction R. The core duct 442 may be referred to as a second stream.

The fan section 450 includes a fan 452, which is the primary fan in non-limiting example. One difference is that the fan 452 is an open rotor or unducted fan. In such a manner, the gas turbine engine 400 may be referred to as an open rotor engine. The fan 452 includes fan blades 454, while only a single flan blade is illustrated in FIG. 6 it will be understood that an array of fan blades are included. Moreover, the fan blades 454 can be arranged in equal spacing around the engine centerline 412. Each fan blade 454 has a root, a tip, and a span defined between the root and the tip. Each fan blade 454 defines a central blade axis 456. For this embodiment, each fan blade 454 of the fan 452 is rotatable about its central blade axis 456, e.g., in unison with one another. One or more actuators 458 are provided to facilitate such rotation and therefore may be used to change a pitch of the fan blades 454.

The fan blades 454 are rotatable about the engine centerline 412. As noted above, the fan 452 is drivingly coupled with the low pressure turbine 434 via the LP shaft 438. In a non-limiting example, the fan 452 is coupled with the LP shaft 438 via a speed reduction device, which can include by way of non-limiting examples a power gearbox or a speed reduction gearbox 455, e.g., in an indirect-drive or geared-drive configuration.

The fan section 450 further includes a fan guide vane array 460 that includes fan guide vanes 462, again while only one fan guide vane is shown in FIG. 6 it will be understood that the fan guide vanes 462 are disposed around the engine centerline 412. The fan guide vanes 462 are mounted to the fan cowl 470. In a non-limiting example, the fan guide vanes 462 are not rotatable about the engine centerline 412. Each of the fan guide vanes 462 has a root, a tip and a span defined between the root and the tip. The fan guide vanes 462 may be unshrouded as shown in FIG. 6 or, alternatively, may be shrouded, e.g., by an annular shroud spaced outward from the tips of the fan guide vanes 462 along the radial direction R or attached to the fan guide vanes 462.

Each fan guide vane 462 defines a central blade axis 464. By way of non-limiting example, each of the fan guide vanes 462 of the fan guide vane array 460 is rotatable about its respective central blade axis 464, e.g., in unison with one another. One or more actuators 466 are provided to facilitate such rotation and therefore may be used to change a pitch of the fan guide vane 462 about its respective central blade axis 464. However, in other embodiments, each of the fan guide vanes 462 may be fixed or unable to be pitched about its central blade axis 464.

It will be understood that each of the fan blades 454 may form a composite airfoil and that the fan blades 454 can form a first stage of airfoils as described above. More specifically, each of the fan blades 454 can include a first leading edge protector 454a. It will be understood that the fan blades 454 forming the first stage of airfoils are similar to the previously described airfoils 130, 230a, and 340 with it being understood that the description of like parts applies to the fan blades unless otherwise noted.

Further still, it will be understood that each of the fan guide vanes 462 may form a composite airfoil. Further still, in the illustrated example, the fan guide vanes 462 can form a second stage of airfoils as described above. More specifically, each of the fan guide vanes 462 can include a second leading edge protector 462a. It will be understood that the fan guide vanes 462 forming the second stage of airfoils is similar to the previously described airfoils 130, 230b, and 352 with it being understood that the description of like parts applies to the fan guide vanes 462 unless otherwise noted.

It will be understood that the fan blades 454 and the fan guide vanes 462 are similar to the previously described first and second airfoil pairs with dimensions fitting in the ranges set out in TABLE 4 above.

Another difference is that the illustrated example in FIG. 6, in addition to the unducted fan 452, shows a ducted fan 484 included aft of the fan 452. In this manner, the engine 400 includes both a ducted fan 484 and an unducted fan 452, which both serve to generate thrust through the movement of air without passage through at least a portion of the turbomachine 420 (e.g., without passage through the HP compressor 428 and combustion section for the embodiment depicted). The ducted fan 484 is rotatable about the engine centerline 412. The ducted fan 484 is, by way of non-limiting example, driven by the low pressure turbine 434 (e.g., coupled to the LP shaft 438). The fan 452 may be referred to as the primary fan, and the ducted fan 484 may be referred to as a secondary fan. It will be appreciated that these terms "primary" and "secondary" are terms of convenience, and do not imply any particular importance, power, or the like.

The ducted fan 484 includes a plurality of fan blades (not separately labeled in FIG. 6) arranged in a single stage, such that the ducted fan 484 may be referred to as a single stage fan. The fan blades of the ducted fan 484 can be arranged in equal spacing around the engine centerline 412. Each blade of the ducted fan 484 has a root, a tip, and a span defined between the root and the tip.

The fan cowl 470 annularly encases at least a portion of the core cowl 422 and is generally positioned outward of at least a portion of the core cowl 422 along the radial direction R. Particularly, a downstream section of the fan cowl 470 extends over a forward portion of the core cowl 422 to define a fan duct flowpath, or simply a fan duct 472. The fan flowpath or fan duct 472 may be understood as forming at least a portion of the third stream of the engine 400.

Incoming air may enter through the fan duct 472 through a fan duct inlet 476 and may exit through a fan exhaust nozzle 478 to produce propulsive thrust. The fan duct 472 is an annular duct positioned generally outward of the core duct 442 along the radial direction R. The fan cowl 470 and the core cowl 422 are connected together and supported by a plurality of substantially radially extending, circumferentially-spaced stationary struts 474 (only one of which is shown in FIG. 6). The stationary struts 474 may each be aerodynamically contoured to direct air flowing thereby. Other struts in addition to the stationary struts 474 may be used to connect and support the fan cowl 470, the core cowl

422, or a combination thereof. In many embodiments, the fan duct 472 and the core duct 442 may at least partially co-extend axially on opposite radial sides of the core cowl 422. For example, the fan duct 472 and the core duct 442 may each extend directly from a leading edge 444 of the core cowl 422 and may partially co-extend generally axially on opposite radial sides of the core cowl 422.

The engine 400 also defines or includes an inlet duct 480. The inlet duct 480 extends between the engine inlet 482 and the core inlet 424, the fan duct inlet 476, or a combination thereof. The engine inlet 482 is defined generally at the forward end of the fan cowl 470 and is positioned between the fan 452 and the fan guide vane array 460 along the axial direction A. The inlet duct 480 is an annular duct that is positioned inward of the fan cowl 470 along the radial direction R. Air flowing downstream along the inlet duct 480 is split, not necessarily evenly, into the core duct 442 and the fan duct 472 by a fan duct splitter or leading edge 444 of the core cowl 422. In the embodiment depicted, the inlet duct 480 is wider than the core duct 442 along the radial direction R. The inlet duct 480 is also wider than the fan duct 472 along the radial direction R.

Air passing through the fan duct 472 may be relatively cooler than one or more fluids utilized in the turbomachine 420. In this way, one or more heat exchangers 486 may be positioned in thermal communication with the fan duct 472. For example, one or more heat exchangers 486 may be disposed within the fan duct 472 and utilized to cool one or more fluids from the core engine with the air passing through the fan duct 472, as a resource for removing heat from a fluid, e.g., compressor bleed air, oil, or fuel. The heat exchanger 486 may be an annular heat exchanger.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

It will be understood that a speed reduction device including, but not limited to, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than or equal to 2. For example, in particular embodiments, the gear ratio is within a range of 4.1 to 14.0, within a range of 4.5 to 14.0, or within a range of 6.0 to 14.0.

In certain embodiments, the gear ratio is within a range of 4.5 to 12 or within a range of 6.0 to 11.0. As such, in some embodiments, the fan can be configured to rotate at a rotational speed of 700 to 1500 revolutions per minute (rpm) at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

The SPF is useful for making trade-offs when determining an amount of protection on a first airfoil in relationship to an amount on an airfoil downstream of the first airfoil. For example, when there is a limited space available for a fan blade in a fan section, knowledge of those dimensions and the downstream airfoil dimensions enables determination of an acceptable cover with a leading edge protector length allowing for sufficient leading edge protection.

Benefits associated with the SPF described herein include a quick assessment of design parameters in terms of composite airfoils in downstream relationship. Further, the SPF described herein enables a quick visualization of tradeoffs in terms of geometry that are bounded by the constraints imposed by the materials used, the available space in which the composite airfoils are located, the type of turbine engine or system enclosures and the configuration of surrounding components, or any other design constraint. The SPF enables the manufacturing of a high performing composite airfoil with peak performance with the factors available. While narrowing these multiple factors to a region of possibilities saves time, money, and resources, the largest benefit is at the system level, where the composite airfoils described herein enable improved system performance. Previously developed composite airfoils may peak in one area of performance by design, but lose efficiency or lifetime benefits in another area of performance. In other words, the stage performance factor enables the development and production of higher performing composite airfoils across multiple performance metrics within a given set of constraints.

As will be appreciated from the description above, an airfoil protection factor (APF) may be used to select an amount of coverage provided by a leading edge protector based on the leading edge length LL and the chord length CL of the airfoil. The APF is particularly important when considering weight requirements of a gas turbine engine. For example, the additional weight added by including some leading edge protectors may be offset by the weight savings from airfoils formed of composite materials.

It has further been found that an airfoil made of composite materials can include regions having different material properties. For example, the airfoil can include a first region formed of a first composite material and a second region formed of a second composite material. The first region can be strengthened with, e.g., carbon fibers and the second region can be strengthened, e.g., with high-elongation fibers. High-elongation fibers provide a higher strain to failure capability compared to carbon fibers alone.

Unexpectedly, such a configuration was found to be particularly useful when utilized with the leading edge protector contemplated by the APF and SPF relationships above, given an amount of stress absorbed by the leading edge protector contemplated by the APF and SPF relationships above. In particular, when adding a metallic cladding to the airfoil to provide additional rigidity and stability to the airfoil (such as via the leading edge protector), in combination with the airfoil including regions having different material properties, such as metallic cladding, the leading edge protector may cover a smaller area than would otherwise be required due to the incorporation of the high-elongation fibers in one of the regions.

Accordingly, the present disclosure provides multi-material reinforcement of airfoils in combination with a leading edge protector contemplated by the APF and SPF relationships disclosed herein, resulting in a gas turbine engine having improved durability, improved system performance, and weight savings.

Figure 7:
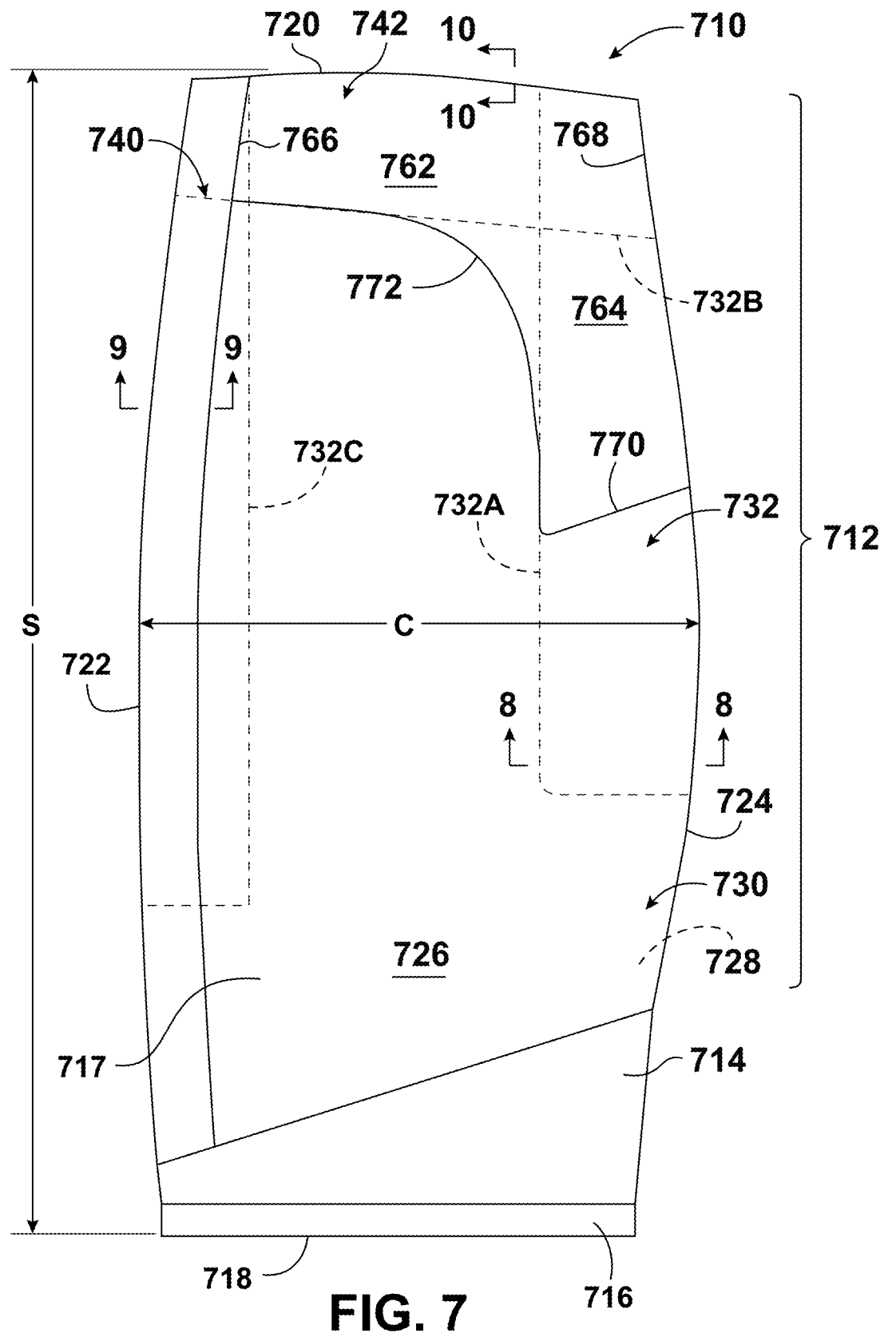
FIG. 7 is a side elevation view of a gas turbine engine fan blade according to an exemplary embodiment of the present disclosure.

FIG. 7 illustrates an exemplary fan blade 710 for a gas turbine engine, such as the turbine engines 10, 310, 400 discussed above. The fan blade 710 includes an airfoil 712, shank 714, and dovetail 716. A portion of the airfoil 712, along with the shank 714 and the dovetail 716, are part of a unitary airfoil body 717. The airfoil 712 extends between a root 718 and a tip 720, and has a leading edge 722 and a trailing edge 724. Opposed convex and concave sides 726 and 728, respectively, extend between the leading edge 722 and the trailing edge 724. The tip 720, the leading edge 722, and the trailing edge 724 can each be considered a "free edge" of the airfoil body 717.

It should be understood that the fan blade 710 is merely exemplary. For example, the airfoil body 717 may be incorporated as a blade of the set of fan blades 42 or a blade from the compressor blades 57, 58 or the turbine blades 68, 70, as discussed above. Further, the airfoil body 717 can be a vane of the set of OGVs 82 or a vane of the static vanes 60, 62, 72, 74. It is contemplated that the airfoil body 717 can be a blade, vane, airfoil, or other component of any turbine engine, such as, but not limited to, a gas turbine engine, a turboprop engine, a turboshaft engine, or a turbofan engine.

In at least one example embodiment, the airfoil body 717 is made from a composite material. The composite material, as defined herein, may be a material including two or more distinct materials combined into one structure, such as a matrix having reinforcing fibers embedded therein. One example of a composite system suitable for use in aerospace applications includes an epoxy matrix with carbon fiber reinforcement.

More specifically, the airfoil body 717 incorporates two or more regions wherein each region comprises a unique composite system. The airfoil body 717 includes a primary region 730 made from a first composite system having a first set of physical properties that includes a first stiffness and a first elongation. "Elongation," as used herein, refers to the increase in gage length of a material specimen before tensile failure. This increase may be expressed as a percentage of the original gage length. This usage is consistent with the commonly accepted definition of the term. In the illustrated example, the primary region 730 comprises an epoxy matrix with carbon reinforcing fibers. In general, the primary region 730 extends throughout the majority of the airfoil body 717.

The airfoil body 717 may incorporate one or more secondary regions. The secondary regions, designated 732 collectively, are made from a second composite system having a second set of physical properties that includes a second stiffness and a second elongation. More specifically, the second stiffness is less than the first stiffness, and the second elongation is greater than the first elongation. Stated another way, each secondary region 732 is less stiff (and may be weaker in terms of yield stress and/or ultimate tensile stress) than the primary region 730, but allows more deflection or strain to failure. In the illustrated example, some or all of each secondary region 732 comprises an epoxy matrix with reinforcing fibers having greater elongation than carbon fibers, referred to generally herein as "high-elongation" fibers. One non-limiting example of a high-elongation fiber is glass fiber. For example, glass fibers commercially available as "E-glass" or "S-glass" may be used for this purpose. In general, each secondary region 732 extends over a relatively small portion of the airfoil body 717, preferably a portion that is subject to high strains during an impact.

In at least one example embodiment, as shown in FIG. 7, the airfoil body 717 includes three different secondary regions 732A, 732B, and 732C. The boundaries of the secondary regions 732A, 732B, and 732C are delineated by dashed lines. Each secondary region 732A, 732B, and 732C is disposed adjacent to one or more of the free edges of the airfoil body 717, including the tip 720, the leading edge 722, and the trailing edge 724. A first example secondary region is labeled 732A. In the radial direction, the secondary region 732A begins at a location approximately ¼ of the span "S" of the fan blade 710 away from the root 718, and extends to the tip 720 of the fan blade 710. In the chordwise direction, the secondary region 732A extends from the trailing edge 724 forward, from the leading edge 722 aft-ward, covering approximately ⅓ of the chord dimension "C" of the fan blade 710. These dimensions can be varied to suit a particular application.

A second example secondary region is labeled 732B and is positioned adjacent the tip 720. From the tip 720, the second secondary region 7732B extends radially to cover ¼ of the span S and covers the entire chord dimension C.

A third example secondary region is labeled 732C and is positioned adjacent to the leading edge 722. In the radial direction, the secondary region 732C begins at a location approximately ¼ of the span S away from the root 718, and extends to the tip 720. In the chordwise direction, the secondary region 732C extends from the leading edge 722 aft-ward, covering approximately ⅓ of the chord dimension C.

One or more of the example secondary regions 732A, 732B, and 732C described above may be implemented individually or in combination. For example, a single, large secondary region designated 732 having an inverted "U" shape may be provided, representing the union of all three secondary regions 732A, 732B, and 732C.

In at least one example embodiment, it may be desirable to limit the size of the secondary regions 732 because of their lower strength. Furthermore, it may be desirable to locate the intersection of the primary region 730 and the secondary regions 732 in an area that is not subject to high stresses. Accordingly, the exact size and shape of the secondary regions 732 may be determined on a case-by-case basis.

Figure 8:
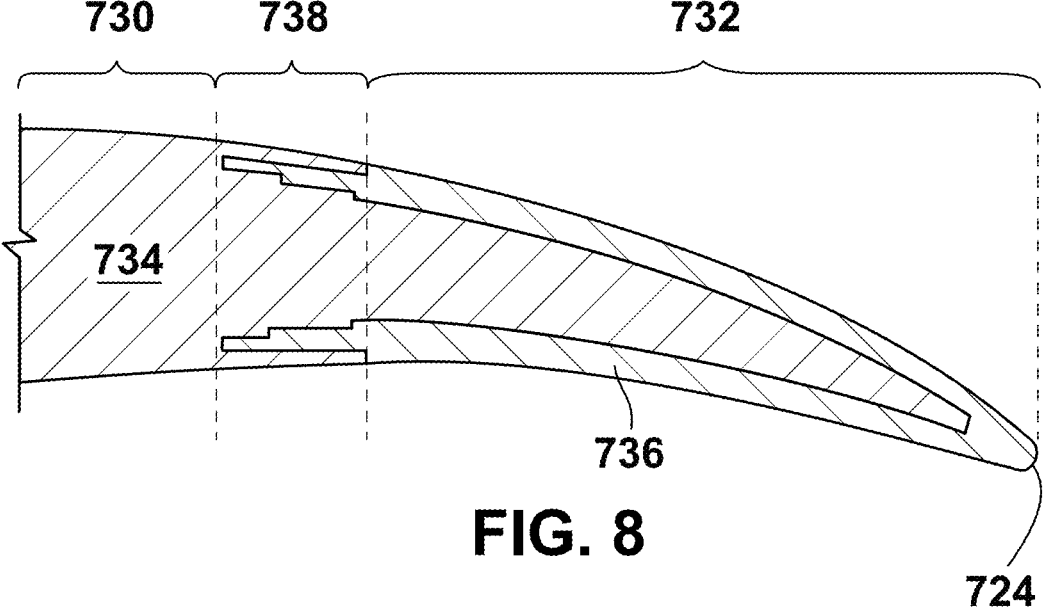
FIG. 8 is a cross-sectional view taken along line 8-8 of FIG. 7 according to an exemplary embodiment of the present disclosure.

FIG. 8 provides a detailed, cross-sectional view of the primary and secondary regions 730, 732. This view is representative of the construction of a single collective U-shaped secondary region 732, as well as any of the individual secondary regions 732A, 732B, or 732C described above. In the primary region 730, the entire thickness of the airfoil body 717 comprises a first composite material 734 such as an epoxy matrix strengthened with carbon fibers. In the secondary region 732, the inner core of the airfoil body 717 comprises the first composite material 734, while an outer skin comprises a second composite material 736 such as an epoxy matrix strengthened with high-elongation fibers, for example E-glass or S-glass fibers. The relative thickness of the different reinforcing fibers may be varied to suit a particular application. In the illustrated example, a small portion of the airfoil body 717 immediately adjacent to the free edge (such as the trailing edge 724 shown) comprises an epoxy matrix with high-elongation fibers through its entire thickness.

A transition zone 738 may be provided between the first and secondary regions 730, 732 in order to avoid stress concentrations at the junctures between dissimilar materials. In the illustrated example, the thickness of the second composite material 736 is reduced in a staggered, or "stair-stepped," configuration within the transition zone 738. Additionally, a layer of the first composite material 734 may overlie at least a portion of the second composite material 736 within the transition zone 738 in order to create an interlocking joint. The exact transition of the staggered, "stair-stepped" pattern is determined on a case-by-case basis, given different coverage areas of first and second composite material.

The primary and secondary regions 730, 732 may be manufactured concurrently, for example by providing a layup of the desired configuration of reinforcing fibers, infiltrating the fiber layup with uncured resin, and then curing the resin.

In addition to the high-elongation fibers, the fan blade 710 may also incorporate at least one metallic cladding element. As shown in FIG. 7, the cladding elements comprise a leading edge guard 740 and a tip cap 742. The leading edge guard 740 may be similar or analogous to the leading edge protectors 140, 140a, 140b, 240a, 240b discussed above. For example, the leading edge guard 740 may be incorporated in combination with or in place of the leading edge protectors 140, 140a, 140b, 240a, 240b.

In at least one example embodiment, the leading edge guard 740 is attached to the leading edge 722. The leading edge guard 740 provides the fan blade 710 with additional impact resistance, erosion resistance, and improved resistance of the composite structure to delamination.

Figure 9:
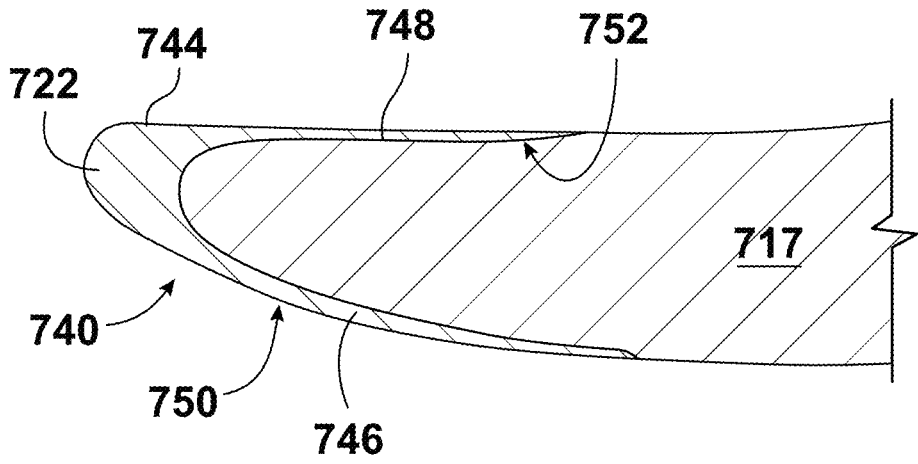
FIG. 9 is a cross-sectional view taken along line 9-9 of FIG. 7 according to an exemplary embodiment of the present disclosure.

With reference to FIG. 9, the leading edge guard 740 comprises a nose 744 with a pair of wings 746 and 748 extending aft therefrom. The wings 746 and 748 taper in thickness as they extend away from the nose 744. Exterior surfaces of the nose 744 and wings 746 and 748 collectively define an exterior surface 750 of the leading edge guard 740. The shape and dimensions of the exterior surface 750 are selected to function as an aerodynamic extension of the airfoil body 717. For example, the exterior shape of the airfoil 712 is defined in part by the airfoil body 717 and in part by the leading edge guard 740. The leading edge guard 740 may be attached to the airfoil body 717 with an adhesive. Moreover, interior surfaces of the nose 744 and wings 746 and 748 collectively define an interior surface 752 of the leading edge guard 740. The shape and dimensions of the interior surface 752 are selected to closely fit the exterior of the airfoil body 717.

In at least one example embodiment, the leading edge guard 740 may be formed from a metal alloy of a composition providing desired strength and weight characteristics. Non-limiting examples of suitable alloys for construction of the leading edge guard 740 include titanium alloys and nickel alloys.

The tip cap 742 overlies portions of the convex and concave sides 726, 728 adjacent to the tip 720. The tip cap 742 provides additional impact protection, as well as stiffens the airfoil body 717 in the free edge regions of the tip 720 and the trailing edge 724. As shown in FIG. 4, the tip cap 742 includes a pair of side walls 756 and 758. Exterior surfaces of the side walls 756 and 758 collectively define an exterior surface 760 of the tip cap 742. The shape and dimensions of the exterior surface 760 are selected to function as an aerodynamic extension of the airfoil body 717. For example, the exterior shape of the airfoil 712 is defined in part by the airfoil body 717 and in part by the tip cap 742. In at least one example embodiment, the tip cap 742 may be attached to the airfoil body 717 with a known type of adhesive.

With reference to FIG. 7, the tip cap 742 includes a tip portion 762 and a trailing edge portion 764. The tip portion 762 and the trailing edge portion 764 roughly define an L-shape. An upper forward edge 766 of the tip cap 742 abuts the leading edge guard 740. An upper aft edge 768 of the tip cap 742 follows the trailing edge 724 of the airfoil body 717. A lower aft edge 770 of the tip 720 extends from the upper aft edge 768 axially forward and radially inward. A lower forward edge 772 of the tip cap 742 interconnects the lower aft edge 770 and the upper forward edge 766.

Figure 10:
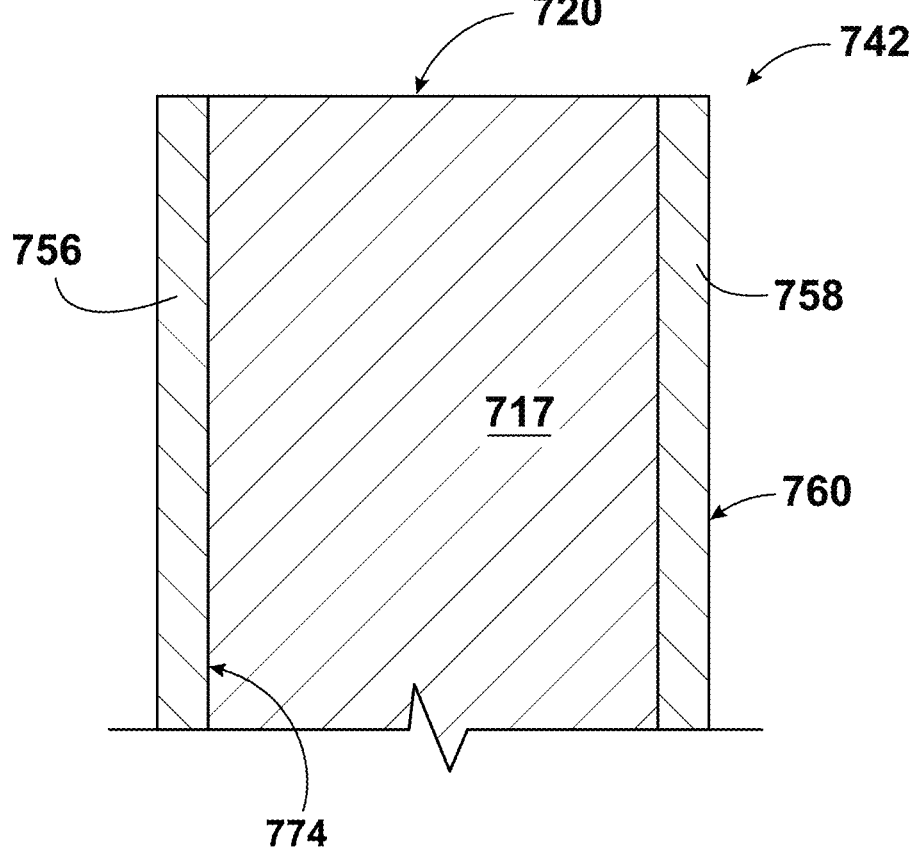
FIG. 10 is a cross-sectional view taken along line 10-10 of FIG. 7 according to an exemplary embodiment of the present disclosure.

As shown in FIG. 10, interior surfaces of the side walls 756 and 758 collectively define an interior surface 774 of the tip cap 742. The shape and dimensions of the interior surface 774 are selected to closely fit the exterior of the airfoil body 717.

Referring again to FIG. 7, in the radial direction, the trailing edge portion 764 begins at the tip 720 of the fan blade 710, and extends to a location approximately ½ of the span S of the fan blade 710 in the chordwise direction, the trailing edge portion 764 extends from the trailing edge 724 forward, covering approximately ⅓ of the chord C of the fan blade 710. The tip cap 742 may or may not overly a portion of the secondary region 732 as these dimensions can be varied to suit a particular application. It may be desirable to limit the size of the tip cap 742 in order to minimize its weight in some example embodiments.

In at least one example embodiment, the tip cap 742 may be made from a metal alloy of a composition providing desired strength and weight characteristics. Non-limiting examples of suitable alloys for construction of the tip cap 742 include titanium alloys and nickel alloys.

Moreover, the fan blade 710 described above incorporates the beneficial properties of composite and metallic materials to maximize the impact capability and aerodynamic performance, while minimizing the overall weight of the blade.

The incorporation of high-elongation fibers in the composite body may provide a higher strain to failure capability compared to the use of carbon fibers only. The use of the metallic tip cap may also reduce any additional deflection of the blade that may be caused by the relatively less stiff composite material. Additionally, the incorporation of the high-elongation fibers may permit the tip cap to be significantly smaller than would otherwise be required in a conventional composite airfoil using only carbon fiber. This will provide a weight savings with accompanying improvement in engine efficiency.

The foregoing has described an airfoil with multi-material reinforcement. All of the features disclosed in this specification (including any accompanying claims, abstract and drawings), and/or all of the steps of any method or process so disclosed, may be combined in any combination, except combinations where at least some of such features and/or steps are mutually exclusive.

Further aspects are provided by the subject matter of the following clauses:

A turbine engine, comprising: an engine core defining an engine centerline and comprising a rotor and a stator, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector comprising a first sheath receiving the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector comprising a second sheath receiving the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL))/((SLL/SCL)) to define a stage protection factor (SPF), and wherein the SPF is greater than or equal to 0.7 and less than or equal to 4 ($0.7 \leq SPF \leq 4$).

The turbine engine of any preceding clause, wherein the first stage of composite airfoils and the second stage of composite airfoils include a polymer matrix composite (PMC).

The turbine engine of any preceding clause, wherein at least one of the first leading edge protector or the second leading edge protector is a metallic leading edge protector.

The turbine engine of any preceding clause, wherein the first stage of composite airfoils are fan blades.

The turbine engine of any preceding clause, wherein the second stage of composite airfoils are outlet guide vanes.

The turbine engine of any preceding clause, wherein the first airfoil extends spanwise between a first root and a first tip to define a first span length and wherein the second airfoil extends spanwise between a second root and a second tip to define a second span length.

The turbine engine of any preceding clause, wherein the SPF is determined between 20% and 80% of the first span length and the second span length, inclusive of endpoints.

The turbine engine of any preceding clause, wherein the first stage of composite airfoils has a first number of airfoils and the second stage of composite airfoils has a second number of airfoils and the first number is different than the second number.

The turbine engine of any preceding clause, wherein the first stage of composite airfoils and the second stage of composite airfoils are configured to rotate.

The turbine engine of any preceding clause, wherein the SPF is greater than or equal to 0.95 and less than or equal to 2.5 (0.95≤SPF≤2.5).

The turbine engine of any preceding clause, wherein the first sheath and the second sheath each have a first wall, a second wall, and a third wall interconnecting the first wall and the second wall.

The turbine engine of any preceding clause, wherein the first wall, second wall, and third wall of the leading edge protector are oriented and shaped such that they define a U-shaped or C-shaped channel therebetween.

The turbine engine of any preceding clause, wherein the channel is sized and shaped to receive the composite leading edge of the composite portion.

The turbine engine of any preceding clause, wherein any of the first leading edge protector or the second leading edge protector are coupled to their corresponding composite portion at the corresponding composite leading edge to define at least one seam.

The turbine engine of any preceding clause wherein the at least one seam is two seams on either side of the airfoil, and the corresponding first leading length or second leading length is measured from the corresponding leading edge to the seam furthest from the leading edge.

The turbine engine of any preceding clause wherein the first leading length and the second leading length are measured from their corresponding leading edge to their corresponding seam.

The turbine engine of any preceding clause wherein an amount of overlap between the first sheath or the second sheath and their corresponding.

A turbine engine comprising: an engine core defining an engine centerline and comprising a rotor and a stator; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: $((LL))/((CL))$ to define an airfoil protection factor (APF); and wherein the APF is greater than or equal to 0.1 and less than or equal to 0.3 (0.1≤APF≤0.3).

The turbine engine of any preceding clause, wherein the set of composite airfoils includes a first stage of composite airfoils and a second stage of composite airfoils downstream from the first stage of composite airfoils.

The turbine engine of any preceding clause, wherein the first stage of composite airfoils is a set of fan blades and the second stage of composite airfoils is a set of outlet guide vanes.

The turbine engine of any preceding clause, wherein the first stage of composite airfoils has a first airfoil protection factor (APF1) and the second stage of composite airfoils has a second airfoil protection factor (APF2).

The turbine engine of any preceding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 (0.7≤SPF≤4).

The turbine engine of any preceding clause, wherein the SPF is greater than or equal to 0.95 and less than or equal to 2.5 (0.95≤SPF≤2.5).

The turbine engine of any preceding clause, wherein the set of composite airfoils extend spanwise between a root and a tip to define a span length and the APF is determined between 20% and 80% of the first span length and the second span length.

The turbine engine of any preceding clause, wherein the leading edge protector overlaps with the composite leading edge to define a sheath.

The turbine engine of any preceding clause, wherein the composite portion is formed from a polymer matrix composite (PMC).

The turbine engine of any preceding clause, wherein the leading edge protector is a metallic leading edge protector.

An indirect drive turbine engine, comprising: an engine core defining an engine centerline and comprising a rotor defined by a fan including a plurality of fan blades rotatable about the engine centerline, a stator, a compressor section, a combustor in fluid communication with the compressor section, a turbine section in fluid communication with the combustor, a speed reduction device driven by the turbine section for rotating the fan about the engine centerline, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector comprising a first sheath receiving the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector comprising a second sheath receiving the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL))/((SLL/SCL)) to define a stage protection factor (SPF), and wherein the SPF is greater than or equal to 0.7 and less than or equal to 4 ($0.7 \leq$ SPF$\leq 4$).

The indirect drive turbine engine of any preceding clause, wherein the speed reduction device is a power gearbox.

The indirect drive turbine engine of any preceding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The indirect drive turbine engine of any preceding clause, further comprising a fan casing or nacelle.

The indirect drive turbine engine of any preceding clause, wherein the fan drive turbine has between 3 and 5 stages.

The indirect drive turbine engine of any preceding clause, wherein the speed reduction device is a power gearbox having a power gearbox reduction ratio between 2:1 and 5:1.

The indirect drive turbine engine of any preceding clause, wherein a bypass ratio is between 10:1 and 22:1.

The indirect drive turbine engine of any preceding clause, wherein a fan blade tip speed of the fan is less than 1400 feet per second.

The indirect drive turbine engine of any preceding clause, wherein the core is an open rotor engine.

The indirect drive turbine engine of any preceding clause, wherein the speed reduction device is a power gearbox having a power gearbox reduction ratio between 6:1 and 12:1.

The indirect drive turbine engine of any preceding clause, wherein a bypass ratio is between 25:1 and 125:1.

The indirect drive turbine engine of any preceding clause, wherein the first stage of composite airfoils and the second stage of composite airfoils include a polymer matrix composite (PMC).

The indirect drive turbine engine of any preceding clause, wherein at least one of the first leading edge protector or the second leading edge protector is a metallic leading edge protector.

The indirect drive turbine engine of any preceding clause, wherein the first stage of composite airfoils include the plurality of fan blades.

The indirect drive turbine engine of any preceding clause, wherein the second stage of composite airfoils are outlet guide vanes or fan guide vanes.

The indirect drive turbine engine of any preceding clause, wherein the first airfoil extends spanwise between a first root and a first tip to define a first span length and wherein the second airfoil extends spanwise between a second root and a second tip to define a second span length.

The indirect drive turbine engine of any preceding clause, wherein the SPF is determined between 20% and 80% of the first span length and the second span length, inclusive of endpoints.

The indirect drive turbine engine of any preceding clause, wherein the first stage of composite airfoils has a first number of airfoils and the second stage of composite airfoils has a second number of airfoils and the first number is different than the second number.

The indirect drive turbine engine of any preceding clause, wherein the first stage of composite airfoils and the second stage of composite airfoils are configured to rotate.

The indirect drive turbine engine of any preceding clause, wherein the SPF is greater than or equal to 0.95 and less than or equal to 2.5 ($0.95 \leq$ SPF$\leq 2.5$).

The indirect drive turbine engine of any preceding clause, wherein the first sheath and the second sheath each have a first wall, a second wall, and a third wall interconnecting the first wall and the second wall.

The indirect drive turbine engine of any preceding clause, wherein the first wall, second wall, and third wall of the leading edge protector are oriented and shaped such that they define a U-shaped or C-shaped channel therebetween.

The indirect drive turbine engine of any preceding clause, wherein the channel is sized and shaped to receive the composite leading edge of the composite portion.

The indirect drive turbine engine of any preceding clause, wherein any of the first leading edge protector or the second leading edge protector are coupled to their corresponding composite portion at the corresponding composite leading edge to define at least one seam.

The indirect drive turbine engine of any preceding clause wherein the at least one seam is two seams on either side of the airfoil, and the corresponding first leading length or second leading length is measured from the corresponding leading edge to the seam furthest from the leading edge.

The indirect drive turbine engine of any preceding clause wherein the first leading length and the second leading length are measured from their corresponding leading edge to their corresponding seam.

The indirect drive turbine engine of any preceding clause wherein an amount of overlap between the first sheath or the second sheath and their corresponding.

An indirect drive turbine engine comprising: an engine core defining an engine centerline and comprising a rotor defined by a fan including a plurality of fan blades rotatable about the engine centerline, a stator, a compressor section, a combustor in fluid communication with the compressor section, a turbine section in fluid communication with the combustor, a speed reduction device driven by the turbine section for rotating the fan about the engine centerline; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: ((LL))/((CL)) to define an airfoil protection factor (APF); and wherein the APF is greater than or equal to 0.1 and less than or equal to 0.3 ($0.1 \leq$ APF$\leq 0.3$).

The indirect drive turbine engine of any preceding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The indirect drive turbine engine of any preceding clause, further comprising a fan casing or nacelle.

The indirect drive turbine engine of any preceding clause, wherein the fan drive turbine has between 3 and 5 stages.

The indirect drive turbine engine of any preceding clause, wherein the speed reduction device is a power gearbox having a power gearbox reduction ratio between 2:1 and 5:1.

The indirect drive turbine engine of any preceding clause, wherein a bypass ratio is between 10:1 and 22:1.

The indirect drive turbine engine of any preceding clause, wherein a fan blade tip speed of the fan is less than 1400 feet per second.

The indirect drive turbine engine of any preceding clause, wherein the core is an open rotor engine.

The indirect drive turbine engine of any preceding clause, wherein the speed reduction device is a power gearbox having a power gearbox reduction ratio between 6:1 and 12:1.

The indirect drive turbine engine of any preceding clause, wherein a bypass ratio is between 25:1 and 125:1.

The indirect drive turbine engine of any preceding clause, wherein the set of composite airfoils includes a first stage of composite airfoils and a second stage of composite airfoils downstream from the first stage of composite airfoils.

The indirect drive turbine engine of any preceding clause, wherein the first stage of composite airfoils is the plurality of fan blades and the second stage of composite airfoils is a set of outlet guide vanes or a set of fan guide vanes.

The indirect drive turbine engine of any preceding clause, wherein the first stage of composite airfoils has a first airfoil protection factor (APF1) and the second stage of composite airfoils has a second airfoil protection factor (APF2).

The indirect drive turbine engine of any preceding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 ($0.7 \leq SPF \leq 4$).

The indirect drive turbine engine of any preceding clause, wherein the SPF is greater than or equal to 0.95 and less than or equal to 2.5 ($0.95 \leq SPF \leq 2.5$).

The indirect drive turbine engine of any preceding clause, wherein the set of composite airfoils extend spanwise between a root and a tip to define a span length and the APF is determined between 20% and 80% of the first span length and the second span length.

The indirect drive turbine engine of any preceding clause, wherein the leading edge protector overlaps with the composite leading edge to define a sheath.

The indirect drive turbine engine of any preceding clause, wherein the composite portion is formed from a polymer matrix composite (PMC).

The indirect drive turbine engine of any preceding clause, wherein the leading edge protector is a metallic leading edge protector.

A turbine engine, comprising: an engine core defining an engine centerline and comprising a rotor and a stator, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector receiving at least a portion of the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector receiving at least a portion of the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL))/((SLL/SCL)) to define a stage protection factor (SPF), and wherein the SPF is greater than or equal to 0.7 and less than or equal to 4 ($0.7 \leq SPF \leq 4$).

The turbine engine of any proceeding clause, wherein the first stage of composite airfoils and the second stage of composite airfoils include a polymer matrix composite (PMC).

The turbine engine of any proceeding clause, wherein at least one of the first leading edge protector or the second leading edge protector is a metallic leading edge protector.

The turbine engine of any proceeding clause, wherein the composite airfoils of the first stage of composite airfoils are fan blades.

The turbine engine of any proceeding clause, wherein the composite airfoils of the second stage of composite airfoils are outlet guide vanes.

The turbine engine of any proceeding clause, wherein the first airfoil extends spanwise from a first root to a first tip to define a first span length and wherein the second airfoil extends spanwise from a second root to a second tip to define a second span length, wherein the SPF is determined between 20% and 80% of the first span length and the second span length, inclusive of endpoints.

The turbine engine of any proceeding clause, wherein the first leading edge protector and the second leading edge protector each comprise a sheath.

The turbine engine of any proceeding clause, wherein the first stage of composite airfoils has a first number of airfoils and the second stage of composite airfoils has a second number of airfoils and the first number is different than the second number.

The turbine engine of any proceeding clause, wherein the first stage of composite airfoils and the second stage of composite airfoils are configured to rotate.

The turbine engine of any proceeding clause, wherein the SPF is greater than or equal to 0.95 and less than or equal to 2.5 ($0.95 \leq SPF \leq 2.5$).

The turbine engine of any proceeding clause, wherein the first sheath and the second sheath each have a first wall, a second wall, and a third wall interconnecting the first wall and the second wall.

The turbine engine of any proceeding clause, wherein the first wall, second wall, and third wall of the leading edge protector are oriented and shaped such that they define a U-shaped or C-shaped channel therebetween.

The turbine engine of any proceeding clause, wherein the channel is sized and shaped to receive the composite leading edge of the composite portion.

The turbine engine of any proceeding clause, wherein any of the first leading edge protector or the second leading edge protector are coupled to their corresponding composite portion at the corresponding composite leading edge to define at least one seam.

The turbine engine of any proceeding clause wherein the at least one seam is two seams on either side of the airfoil, and the corresponding first leading length or second leading length is measured from the corresponding leading edge to the seam furthest from the leading edge.

The turbine engine of any proceeding clause wherein the first leading length and the second leading length are measured from their corresponding leading edge to their corresponding seam.

The turbine engine of any proceeding clause wherein an amount of overlap between the first sheath or the second sheath and their corresponding.

A turbine engine comprising: an engine core defining an engine centerline and comprising a rotor and a stator; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: (LL)/(CL) to define an airfoil protection factor (APF); and wherein the APF is greater than or equal to 0.1 and less than or equal to 0.3 ($0.1 \leq APF \leq 0.3$).

The turbine engine of any proceeding clause, wherein the set of composite airfoils includes a first stage of composite airfoils and a second stage of composite airfoils downstream from the first stage of composite airfoils.

The turbine engine of any proceeding clause, wherein the first stage of composite airfoils is a set of fan blades and the second stage of composite airfoils is a set of outlet guide vanes.

The turbine engine of any proceeding clause, wherein the composite airfoils in the first stage of composite airfoils have a first airfoil protection factor (APF1) and the second stage of composite airfoils have a second airfoil protection factor (APF2).

The turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 ($0.7 \leq SPF \leq 4$).

The turbine engine of any proceeding clause, wherein the SPF is greater than or equal to 0.95 and less than or equal to 2.5 ($0.95 \leq SPF \leq 2.5$).

The turbine engine of any proceeding clause, wherein the composite airfoils in the set of composite airfoils extend spanwise between a root and a tip to define a span length and the APF is determined between 20% and 80% of the first span length and the second span length.

The turbine engine of any proceeding clause, wherein the leading edge protector overlaps with the composite leading edge to define a sheath.

The turbine engine of any proceeding clause, wherein the composite portion is formed from a polymer matrix composite (PMC).

The turbine engine of any proceeding clause, wherein the leading edge protector is a metallic leading edge protector.

An airfoil, comprising: an airfoil body having a root and a tip, and convex and concave sides extending between a leading edge and a trailing edge, the airfoil body comprising primary and secondary regions having differing material properties; and at least one metallic cladding element attached to the airfoil body.

The airfoil of any preceding clause, wherein each of the primary and secondary regions comprises a composite material including a matrix having reinforcing fibers embedded therein.

The airfoil of any preceding clause, wherein at least one of the primary and secondary regions comprises a polymeric matrix composite, including carbon reinforcing fibers.

The airfoil of any preceding clause, wherein the secondary region comprises a polymeric matrix composite including high-elongation reinforcing fibers having an elongation greater than that of carbon fibers.

The airfoil of any preceding clause, wherein the high-elongation reinforcing fibers comprise glass fibers.

The airfoil of any preceding clause, wherein the secondary region is disposed adjacent to at least one free edge of the airfoil body.

The airfoil of any preceding clause, wherein the secondary region is disposed adjacent to the leading edge or trailing edge of the airfoil body, and covers approximately one-third of a chord dimension of the airfoil.

The airfoil of any preceding clause, wherein: within the primary region, the entire thickness of the airfoil body comprises a first composite material comprising a polymeric matrix strengthened with carbon fibers; and within the secondary region, an inner core of the airfoil body comprises the first composite material, while an outer skin comprises a second composite material comprising a polymeric matrix strengthened with glass fibers.

The airfoil of any preceding clause, wherein a portion of the secondary region immediately adjacent to some or all the free edges of the airfoil body comprises a polymeric matrix with glass fibers through its entire thickness.

The airfoil of any preceding clause, wherein one of the cladding elements is a leading edge guard attached to the leading edge of the airfoil body, the leading edge guard comprising a nose with spaced-apart first and second wings extending therefrom.

The airfoil of any preceding clause, wherein one of the cladding elements is a tip cap attached to the tip of the airfoil body, the tip cap comprising a pair of side walls extending along the convex and concave sides of the airfoil body.

The airfoil of any preceding clause, wherein an exterior surface of the tip cap acts as an aerodynamic extension of the airfoil body.

The airfoil of any preceding clause, wherein the tip cap is attached to the airfoil body with an adhesive.

The airfoil of any preceding clause, wherein the tip cap includes a tip portion and a trailing edge portion, the two portions defining an L-shape.

The airfoil of any preceding clause, wherein the tip cap extends from the tip of the airfoil body to a location approximately one-half of a span of the airfoil.

The airfoil of any preceding clause, wherein in the chordwise direction, the trailing edge portion of the tip cap extends from the trailing edge forward, covering approximately one-third of a chord dimension of the airfoil body.

An airfoil, comprising: an airfoil body having a root and a tip, and convex and concave sides extending between a leading edge and a trailing edge, the airfoil body comprising primary and secondary regions having differing material properties; at least one metallic cladding element attached to the airfoil body; wherein within the primary region, the entire thickness of the airfoil body comprises a first composite material comprising a polymeric matrix strengthened with carbon fibers; and wherein the secondary region is disposed adjacent to at least one free edge of the airfoil body, and within the secondary region, an inner core of the airfoil body comprises the first composite material, while an outer skin comprises a second composite material comprising a polymeric matrix strengthened with glass fibers.

The airfoil of any preceding clause, wherein a portion of the secondary region immediately adjacent to one or more of the free edges of the airfoil body comprises a polymeric matrix with glass fibers through its entire thickness.

The airfoil of any preceding clause, wherein one of the cladding elements is a tip cap attached to the tip of the airfoil body, the tip cap comprising a pair of side walls extending along the convex and concave sides of the airfoil body.

The airfoil of any preceding clause, wherein the tip cap includes a tip portion and a trailing edge portion, the two portions defining an L-shape.

An airfoil, comprising: an airfoil body having convex and concave sides extending between a leading edge and a trailing edge, the airfoil body comprising primary and secondary regions, wherein each of the primary and secondary regions comprises a composite material including a matrix having reinforcing fibers embedded therein, the primary region having a first elongation, and the secondary region having a second elongation greater than the first elongation; and a metallic cladding element attached to the body, the metallic cladding element covering a portion of the secondary region.

The airfoil of any preceding clause, wherein at least one of the primary and secondary regions comprises a polymeric matrix including carbon reinforcing fibers.

The airfoil of any preceding clause, wherein the secondary region comprises a polymeric matrix including high-elongation reinforcing fibers having an elongation greater than that of carbon fibers.

The airfoil of any preceding clause, wherein the secondary region comprises a polymeric matrix including glass reinforcing fibers.

A turbine engine, comprising: a fan; a turbomachine defining an engine centerline and comprising a compressor section, a combustion section, and a turbine section in serial flow order; the fan comprising a first stage of composite airfoils circumferentially arranged about the engine centerline, a first airfoil of the first stage of composite airfoils comprising: a first composite portion extending chordwise between a first composite leading edge and a first trailing edge and extending spanwise between a first root and a first tip, the first composite portion including a primary region and a secondary region having different material properties; a first leading edge protector receiving at least a portion of the first composite leading edge of the first composite portion, the first leading edge protector extending chordwise from a first leading edge towards the first composite portion for a first leading length (FLL); and the first composite portion and the first leading edge protector together defining an exterior surface of the first airfoil and extending chordwise between the first leading edge and the first trailing edge to define a first chord length (FCL); a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge; a second leading edge protector receiving at least a portion of the second composite leading edge of the second composite portion, the second leading edge protector extending chordwise from a second leading edge towards the second composite portion for a second leading length (SLL); and the second composite portion and the second leading edge protector together defining an exterior surface of the second airfoil and extending chordwise between the second leading edge and the second trailing edge to define a second chord length (SCL); wherein the first leading length (FLL) and the first chord length (FCL) are related to the second leading length (SLL) and the second chord length (SCL) by a stage protection factor (SPF), wherein $SPF=((FLL/FCL))/((SLL/SCL))$ and SPF is greater than or equal to 0.7 and less than or equal to 4 $(0.7 \leq SPF \leq 4)$.

The turbine engine of any preceding clause, wherein each of the primary and secondary regions comprises a composite material including a matrix having reinforcing fibers embedded therein.

The turbine engine of any preceding clause, wherein at least one of the primary and secondary regions comprises a polymeric matrix composite, including carbon reinforcing fibers.

The turbine engine of any preceding clause, wherein the secondary region comprises a polymeric matrix composite including high-elongation reinforcing fibers having an elongation greater than that of carbon fibers.

The turbine engine of any preceding clause, wherein the high-elongation reinforcing fibers comprise glass fibers.

The turbine engine of any preceding clause, wherein the secondary region is disposed adjacent to at least one free edge of the first composite portion.

The turbine engine of any preceding clause, wherein the secondary region is disposed adjacent to the leading edge or trailing edge of the first composite portion, and covers approximately one-third of a chord dimension of the airfoil.

The turbine engine of any preceding clause, wherein: within the primary region, an entire thickness of the first composite portion comprises a first composite material comprising a polymeric matrix strengthened with carbon fibers; and within the secondary region, an inner core of the first composite portion comprises the first composite material, while an outer skin comprises a second composite material comprising a polymeric matrix strengthened with glass fibers.

The turbine engine of any preceding clause, wherein a portion of the secondary region immediately adjacent to some or all free edges of the first composite portion comprises a polymeric matrix with glass fibers through its entire thickness.

The turbine engine of any preceding clause, wherein the first leading edge protector comprises a nose with spaced-apart first and second wings extending therefrom.

The turbine engine of any preceding clause, wherein the first leading edge protector comprises at least one metallic cladding element; the at least one metallic cladding element includes a tip cap attached to the first tip of the first composite portion, the tip cap comprising a pair of side walls extending along opposing sides of the first composite portion.

The turbine engine of any preceding clause, wherein an exterior surface of the tip cap acts as an aerodynamic extension of the first composite portion.

The turbine engine of any preceding clause, wherein the tip cap is attached to the first composite portion with an adhesive.

The turbine engine of any preceding clause, wherein the tip cap includes a tip portion and a trailing edge portion, the tip portion and the trailing edge portion defining an L-shape.

The turbine engine of any preceding clause, wherein the tip cap extends from the first tip of the first composite portion to a location approximately one-half of a span of the first composite portion.

The turbine engine of any preceding clause, wherein in the chordwise direction, the trailing edge portion of the tip cap extends from the trailing edge forward, covering approximately one-third of a chord dimension of the first composite portion.

The turbine engine of any preceding clause, wherein the first stage of composite airfoils and the second stage of composite airfoils include a polymer matrix composite (PMC).

The turbine engine of any preceding clause, wherein at least one of the first leading edge protector or the second leading edge protector is a metallic leading edge protector.

The turbine engine of any preceding clause, wherein the composite airfoils of the first stage of composite airfoils are fan blades.

The turbine engine of any preceding clause, wherein the composite airfoils of the second stage of composite airfoils are outlet guide vanes.

The turbine engine of any preceding clause, wherein the first airfoil extends spanwise between a first root and a first tip to define a first span length and wherein the second airfoil extends spanwise between a second root and a second tip to define a second span length and wherein the SPF is between 20% and 80% of the first span length and the second span length, inclusive of endpoints.

The turbine engine of any preceding clause, wherein the first leading edge protector and the second leading edge protector each comprise a sheath.

The turbine engine of any preceding clause, wherein the first stage of composite airfoils has a first number of airfoils and the second stage of composite airfoils has a second number of airfoils and the first number is different than the second number.

The turbine engine of any preceding clause, wherein the first stage of composite airfoils and the second stage of composite airfoils are configured to rotate.

The turbine engine of any preceding clause, wherein the SPF is greater than or equal to 0.95 and less than or equal to 2.5 (0.95≤SPF≤2.5).

The turbine engine of any preceding clause, further comprising a speed reduction device driven by the turbine section for rotating the fan about the engine centerline.

The turbine engine of any preceding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

A turbine engine comprising: a fan; a turbomachine defining an engine centerline and comprising a compressor section, a combustion section, and a turbine section in serial flow order; and the fan comprising a set of composite airfoils circumferentially arranged about the engine centerline, an airfoil of the set of composite airfoils comprising: a composite portion extending chordwise between a composite leading edge and a trailing edge and extending spanwise between a base and a tip, the composite portion including a primary region and a secondary region having different material properties; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) is related to the chord length (CL) by an airfoil protection factor $(APF)=((LL))/((CL))$ and APF is greater than or equal to 0.1 and less than or equal to 0.3 ($0.1 \leq APF \leq 0.3$).

The turbine engine of any preceding clause, wherein: within the primary region, an entire thickness of the composite portion comprises a first composite material comprising a polymeric matrix strengthened with carbon fibers; and wherein the secondary region is disposed adjacent to at least one free edge of the composite portion, and within the secondary region, an inner core of the composite portion comprises the first composite material, while an outer skin comprises a second composite material comprising a polymeric matrix strengthened with glass fibers.

The turbine engine of any preceding clause, wherein a portion of the secondary region immediately adjacent to one or more of the free edges of the composite portion comprises a polymeric matrix with glass fibers through its entire thickness.

The turbine engine of any preceding clause, wherein the leading edge protector comprises at least one metallic cladding element; the at least one metallic cladding element includes a tip cap attached to the tip of the composite portion, the tip cap comprising a pair of side walls extending along convex and concave sides of the composite portion.

The airfoil of any preceding clause, wherein the tip cap includes a tip portion and a trailing edge portion, the tip portion and the trailing edge portion defining an L-shape.

The turbine engine of any preceding clause, wherein: each of the primary and secondary regions comprises a composite material including a matrix having reinforcing fibers embedded therein, the primary region having a first elongation, and the secondary region having a second elongation greater than the first elongation; and at least one metallic cladding element covers a portion of the secondary region.

The turbine engine of any preceding clause, wherein at least one of the primary and secondary regions comprises a polymeric matrix including carbon reinforcing fibers.

The turbine engine of any preceding clause, wherein the secondary region comprises a polymeric matrix including high-elongation reinforcing fibers having an elongation greater than that of carbon fibers.

The turbine engine of any preceding clause, wherein the secondary region comprises a polymeric matrix including glass reinforcing fibers.

The turbine engine of any preceding clause, wherein the set of composite airfoils includes a first stage of composite airfoils and a second stage of composite airfoils downstream from the first stage of composite airfoils.

The turbine engine of any preceding clause, wherein the first stage of composite airfoils is a set of fan blades and the second stage of composite airfoils is a set of outlet guide vanes.

The turbine engine of any preceding clause, wherein the composite airfoils in the first stage of composite airfoils have a first airfoil protection factor (APF1) and the composite airfoils in the second stage of composite airfoils have a second airfoil protection factor (APF2).

The turbine engine of any preceding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 ($0.7 \leq SPF \leq 4$).

The turbine engine of any preceding clause, wherein the SPF is greater than or equal to 0.95 and less than or equal to 2.5 ($0.95 \leq SPF \leq 2.5$).

The turbine engine of any preceding clause, wherein the composite airfoils in the set of composite airfoils extend spanwise between a root and a tip to define a span length and the APF is determined between 20% and 80% of the span length.

The turbine engine of any preceding clause, wherein the leading edge protector overlaps with the composite leading edge to define a sheath.

The turbine engine of any preceding clause, wherein the composite portion is formed from a polymer matrix composite (PMC).

The turbine engine of any preceding clause, wherein the leading edge protector is metallic leading edge protector.

The turbine engine of any preceding clause, further comprising: a speed reduction device driven by the turbine section for rotating the fan about the engine centerline; and wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine engine comprising:
a fan;
a turbomachine comprising a compressor section, a combustor in fluid communication with the compressor section, and a turbine section in fluid communication with the combustor;
a speed reduction device driven by the turbine section and configured for rotating the fan; and
composite airfoils comprising at least one composite fan blade and at least one composite outlet guide vane downstream from the at least one composite fan blade;
wherein an airfoil of the composite airfoils comprises:
a composite body extending chordwise from a body leading edge to a body trailing edge, and a leading edge protector having a protector leading edge different from the body leading edge, the leading edge protector receiving at least a portion of the body leading edge;
wherein a leading length (LL) extends chordwise from the protector leading edge to an end of the leading edge protector and a chord length (CL) extends chordwise from the protector leading edge to the body trailing edge, and
wherein the LL is related to the CL by an airfoil protection factor $$(APF) = \frac{(LL)}{(CL)};$$

and a first APF (APF1) for the at least one composite fan blade is greater than or equal to 0.2 and less than or equal to 0.30 ($0.2 \leq APF1 \leq 0.3$) and a second APF (APF2) for the at least one composite outlet guide vane is greater than or equal to 0.08 and less than or equal to 0.17 ($0.08 \leq APF2 \leq 0.17$); and
wherein at least one portion of the composite body of the at least one composite fan blade or the at least one composite outlet guide vane is configured to flex or configured to break.

2. The turbine engine of claim 1, wherein the at least one portion of the composite body comprises a matrix having first reinforcing fibers and an adjacent portion of the composite body includes a matrix having second reinforcing fibers, the second reinforcing fibers different from the first reinforcing fibers.

3. The turbine engine of claim 2, wherein the first reinforcing fibers are glass fibers and the second reinforcing fibers are carbon fibers.

4. The turbine engine of claim 3, wherein the leading edge protector comprises at least one metallic cladding element.

5. The turbine engine of claim 4, wherein the leading edge protector covers a smaller area as compared to a leading edge protector for the composite body without the at least one portion.

6. The turbine engine of claim 3, wherein the glass fibers provide a higher strain to failure capability compared to carbon fibers in the composite body alone.

7. The turbine engine of claim 3, wherein the at least one portion of the composite body is disposed adjacent to the body leading edge or the body trailing edge.

8. The turbine engine of claim 1, wherein the APF1 relates to the APF2 by an expression: APF1/APF2 to define a stage protection factor (SPF), and wherein the SPF is greater than or equal to 0.7 and less than or equal to 4 ($0.7 \leq SPF \leq 4$).

9. The turbine engine of claim 8, wherein the SPF is greater than or equal to 0.95 and less than or equal to 2.5 ($0.95 \leq SPF \leq 2.5$).

10. The turbine engine of claim 8, wherein the at least one composite fan blade extends spanwise between a first root and a first tip to define a first span length and the at least one composite outlet guide vane extends spanwise between a second root and a second tip to define a second span length and the SPF is determined at a location between 20% and 80% of the first span length and the second span length, inclusive of endpoints.

11. The turbine engine of claim 1, wherein the speed reduction device is a power gearbox.

12. The turbine engine of claim 1, wherein a bypass ratio is from 10:1 to 22:1.

13. The turbine engine of claim 1, wherein a primary region of the composite body comprises first reinforcing fibers having a first stiffness and a first elongation and a secondary region of the composite body comprises second reinforcing fibers having a second stiffness and a second elongation, wherein the second stiffness is less than the first stiffness and the second elongation is greater than the first elongation.

14. The turbine engine of claim 13, wherein the secondary region comprises a polymeric matrix including high-elongation reinforcing fibers.

15. The turbine engine of claim 14, wherein the high-elongation reinforcing fibers include E-glass fibers, S-glass fibers, or a combination thereof.

16. The turbine engine of claim 13, wherein the leading edge protector covers a portion of the secondary region.

* * * * *